US008526473B2

(12) United States Patent
Baird et al.

(10) Patent No.: US 8,526,473 B2
(45) Date of Patent: Sep. 3, 2013

(54) METHODS AND SYSTEMS FOR DYNAMICALLY GENERATING TAILORED LASER PULSES

(75) Inventors: Brian W. Baird, Portland, OR (US); Clint R. Vandergiessen, Beaverton, OR (US); Steve Swaringen, Rockwall, TX (US); Robert Hainsey, Portland, OR (US); Yunlong Sun, Beaverton, OR (US); Kelly J. Bruland, Portland, OR (US); Andrew Hooper, Beaverton, OR (US)

(73) Assignee: Electro Scientific Industries, Portland, OR (US)

( * ) Notice: Subject to any disclaimer, the term of this patent is extended or adjusted under 35 U.S.C. 154(b) by 1203 days.

(21) Appl. No.: 12/060,076

(22) Filed: Mar. 31, 2008

(65) Prior Publication Data

US 2009/0245302 A1 Oct. 1, 2009

(51) Int. Cl.
*H01L 21/302* (2006.01)
*H01S 3/10* (2006.01)
*B23K 26/38* (2006.01)

(52) U.S. Cl.
USPC ........ 372/25; 438/130; 438/795; 219/121.68; 219/121.69

(58) Field of Classification Search
USPC ............ 219/121.61–121.72, 121.83; 372/20, 372/26, 25; 438/130, 795; 250/492.2
See application file for complete search history.

(56) References Cited

U.S. PATENT DOCUMENTS

| | | | | |
|---|---|---|---|---|
| 5,004,890 A | * | 4/1991 | Lim | 219/121.83 |
| 5,376,770 A | * | 12/1994 | Kuhl et al. | 219/121.83 |
| 5,642,374 A | * | 6/1997 | Wakabayashi et al. | 372/57 |
| 6,054,235 A | * | 4/2000 | Bryan et al. | 430/7 |
| 6,243,405 B1 | * | 6/2001 | Borneis et al. | 372/57 |
| 6,281,471 B1 | | 8/2001 | Smart | |
| 6,385,218 B1 | | 5/2002 | Sasaki et al. | |
| 6,479,788 B1 | * | 11/2002 | Arai et al. | 219/121.71 |
| 6,574,250 B2 | | 6/2003 | Sun et al. | |
| 6,595,985 B1 | * | 7/2003 | Tobinick | 606/9 |
| 6,661,820 B1 | | 12/2003 | Camilleri et al. | |
| 6,693,031 B2 | | 2/2004 | Advocate, Jr. et al. | |

(Continued)

FOREIGN PATENT DOCUMENTS

| CN | 101103500 A | 1/2008 |
|---|---|---|
| WO | 2008014331 | 1/2008 |

OTHER PUBLICATIONS

Notification of Transmittal of the International Search Report and The Written Opinion of the International Searching Authority, or the Declaration for International Application No. PCT/US2009/038057, filed Mar. 24, 2009.

(Continued)

*Primary Examiner* — Samuel M Heinrich
(74) *Attorney, Agent, or Firm* — Stoel Rives LLP

(57) ABSTRACT

Processing workpieces such as semiconductor wafers or other materials with a laser includes selecting a target to process that corresponds to a target class associated with a predefined temporal pulse profile. The temporal pulse profile includes a first portion that defines a first time duration, and a second portion that defines a second time duration. A method includes generating a laser pulse based on laser system input parameters configured to shape the laser pulse according to the temporal pulse profile, detecting the generated laser pulse, comparing the generated laser pulse to the temporal pulse profile, and adjusting the laser system input parameters based on the comparison.

20 Claims, 14 Drawing Sheets

(56) References Cited

U.S. PATENT DOCUMENTS

| | | | |
|---|---|---|---|
| 6,727,458 B2 | 4/2004 | Smart | |
| 6,961,355 B1 * | 11/2005 | Yin et al. | 372/25 |
| 7,126,746 B2 | 10/2006 | Sun et al. | |
| 7,173,212 B1 | 2/2007 | Semak | |
| 7,241,669 B2 | 7/2007 | Swenson et al. | |
| 7,244,906 B2 * | 7/2007 | Jordens et al. | 219/121.62 |
| 7,348,516 B2 | 3/2008 | Sun et al. | |
| 7,428,253 B2 * | 9/2008 | Murison et al. | 372/26 |
| 7,817,685 B2 | 10/2010 | Osako et al. | |
| 2002/0167581 A1 | 11/2002 | Cordingley et al. | |
| 2005/0067388 A1 | 3/2005 | Sun et al. | |
| 2005/0272184 A1 | 12/2005 | Hiramatsu et al. | |
| 2006/0126678 A1 | 6/2006 | Sun et al. | |
| 2006/0159138 A1 | 7/2006 | Deladurantaye et al. | |
| 2007/0045253 A1 | 3/2007 | Jordens et al. | |
| 2008/0067155 A1 | 3/2008 | Gu | |
| 2008/0164240 A1 * | 7/2008 | Cordingley et al. | 219/121.61 |
| 2008/0181269 A1 | 7/2008 | Osako et al. | |
| 2008/0203071 A1 | 8/2008 | Sun et al. | |
| 2009/0126870 A1 * | 5/2009 | Zadoyan et al. | 156/344 |
| 2009/0245301 A1 | 10/2009 | Peng et al. | |
| 2010/0009550 A1 | 1/2010 | Tsujikawa et al. | |
| 2011/0210105 A1 * | 9/2011 | Romashko et al. | 219/121.72 |

OTHER PUBLICATIONS

Notice of Allowance and Fee(s) due mailed Apr. 12, 2013, for U.S. Appl. 13/076,810, filed Mar. 31, 2011.

Office Action mailed Nov. 21, 2012, for U.S. Appl. No. 12/753,659, filed Apr. 2, 2010.

Notice of Allowance and Fee(s) due mailed Feb. 28, 2013, for U.S. Appl. No. 12/753,659, filed Apr. 2, 2010.

* cited by examiner $t_1$ = rise time
$t_2-t_1$ = spike time
$t_3-t_2$ = plateau time
$t_4-t_3$ = fall time
P1 = max amplitude
P2 = first plateau amplitude
P1, P2 adjustable $t_1$ = rise time
$t_2-t_1$ = first plateau time
$t_3-t_2$ = spike time
$t_4-t_3$ = second plateau time
$t_5-t_4$ = fall time
P1 = max amplitude
P2 = first plateau amplitude
P3 = second plateau time
P1, P2, P3 adjustable

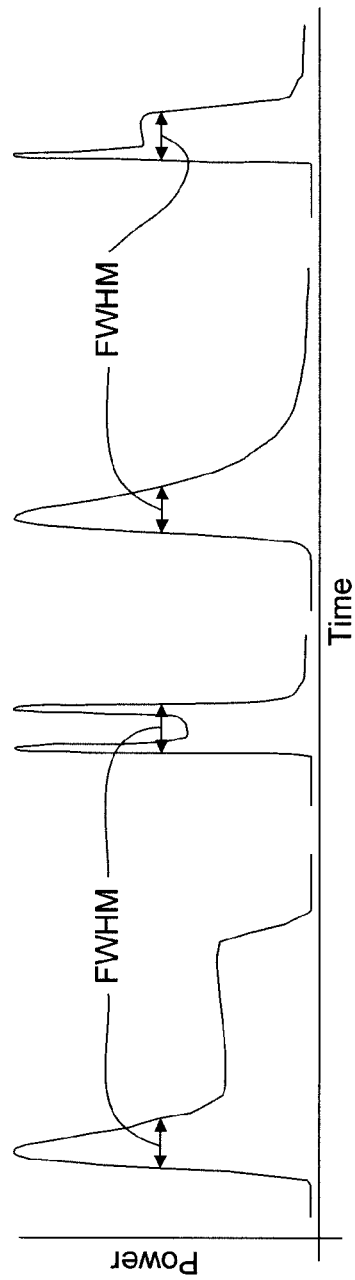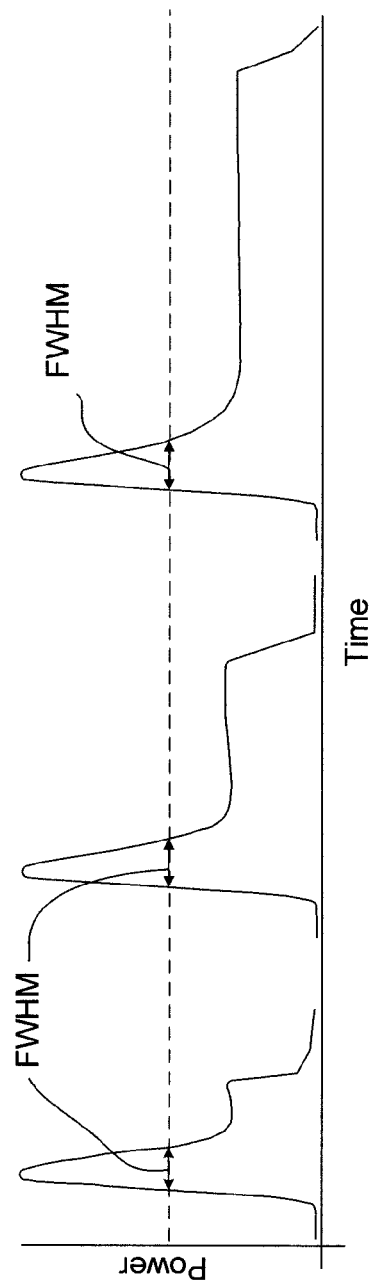

METHODS AND SYSTEMS FOR DYNAMICALLY GENERATING TAILORED LASER PULSES

TECHNICAL FIELD

This disclosure relates to laser processing systems. In particular, this disclosure relates to laser systems and methods for dynamically generating and monitoring multiple laser pulses with respective temporal profiles tailored to process particular target structures.

BACKGROUND INFORMATION

Laser processing systems employed for processing dynamic random access memory (DRAM) and other devices commonly use a Q-switched diode pumped solid state laser. When processing memory devices, for example, a single laser pulse is commonly employed to sever an electrically conductive link structure. In another industrial application, Q-switched diode pumped solid state lasers are used to trim resistance values of discrete and embedded components.

Some laser processing systems use different operating modes to perform different functions. For example, the ESI Model 9830 available from Electro Scientific Industries, Inc. of Portland, Oreg., the assignee of the present patent application, uses a diode pumped Q-switched neodymium-doped yttrium vandate (Nd:YVO$_4$) laser operating at a pulse repetition frequency of approximately 50 kHz for laser processing of semiconductor memory and related devices. This laser system provides a pulsed laser output for processing link structures and a continuous wave (CW) laser output for scanning beam-to-work targets. As another example, the ESI Model 9835, also available from Electro Scientific Industries, Inc., uses a diode pumped Q-switched, frequency-tripled Nd:YVO$_4$ laser for laser processing semiconductor memory and related devices. This laser system uses a first pulsed laser output at a PRF of approximately 50 kHz for processing link structures and a second pulsed laser output at a PRF of approximately 90 kHz for scanning beam-to-work targets. In some systems, higher PRFs (e.g., approximately 100 kHz) are also possible. Generally, the pulse widths of laser pulses generated by such laser systems are functionally dependent on the PRF selected and are not independently adjustable based on differences between target structures or other process variables.

Some systems have used tailored pulse shapes to process workpieces. For example, U.S. Pat. No. 7,348,516, which is assigned to the assignee of the present patent application, describes one such laser technology in which laser processing of conductive links on memory chips or other integrated circuit (IC) chips is accomplished by laser systems and methods employing laser pulses with a specially tailored intensity profile (pulse shape) for better processing quality and yield. As another example, U.S. Pat. No. 7,126,746, which is assigned to the assignee of the present patent application, describes a method of employing a laser processing system that is capable of using multiple laser pulse temporal profiles to process semiconductor workpiece structures on one or more semiconductor wafers. Generally, in a link processing system there are several laser pulse parameters that define the laser-material interaction. In addition to laser wavelength, these parameters include both spatial characteristics (e.g., spot size, waist location, and ellipticity) as well as temporal characteristics (e.g., peak power, pulse energy, pulse width, and pulse shape). In order to provide a robust process that can be repeated on multiple link processing systems, the laser pulse parameters may be: (a) passively controlled by design and measured during manufacturing to verify performance; (b) controlled through calibrations performed periodically; or (c) actively measured and controlled with a feedback loop. In certain laser processing systems, such as a tailored pulse laser processing system, method (c) may provide more flexibility than methods (a) or (b).

Typical laser processing systems generally monitor the various laser parameters in different ways. For example, Table 1 summarizes the current state of the art with respect to laser pulse process parameter control.

TABLE 1

| Type | Parameter | Method | Notes |
|---|---|---|---|
| Spatial | Spot Size | (b) Calibration | Calibrated as part of the "Programmable Spot (PS) Calibration" during manufacturing and preventative maintenance. Systems can be configured to monitor spot size periodically, but feedback correction is generally not allowed. |
| Spatial | Waist Location | (c) Feedback | Measured during wafer alignment and controlled at runtime by moving the objective lens with z-stage. |
| Spatial | Ellipticity | (a) Passive | Measured during PS Calibration. There may also be automated adjustments. |
| Spatial | Asymmetry | (a) Passive | Measured during PS Calibration. There may also be automated adjustments. |
| Temporal | Pulse Energy | (c) Feedback | Default system configuration allows for runtime feedback of pulse energy as measured by a pulse detector and as controlled with an acousto-optic modulator (AOM). |
| Temporal | Peak Power | (c) Feedback (optional) | System can be configured to allow runtime feedback of peak power instead of pulse energy using the pulse detector. This is generally optional. |
| Temporal | Pulse Width | (a) Passive | Considered constant for a given laser architecture operating at the same laser repetition rate. Measured during manufacturing to confirm that the parameter is within specification. |

TABLE 1-continued

| Type | Parameter | Method | Notes |
| --- | --- | --- | --- |
| Temporal | Pulse Shape | N/A | For solid state lasers, peak height (e.g., peak power), pulse energy, and pulse width sufficiently describe the temporal shape. For a tailored pulse system, however, this is not true. |

FIGS. 1A and 1B are example temporal pulse shapes of laser pulses generated by typical solid state lasers. The pulse shown in FIG. 1A may have been shaped by optical elements as is known in the art to produce a square-wave pulse. As shown in Table 1 and in FIGS. 1A and 1B, a typical solid state pulse shape is well described by its peak power, pulse energy (time integration of the power curve), and pulse width measured at a full-width half-maximum (FWHM) value. Feedback from a pulse detector may be used to determine pulse energy and/or peak power. The pulse detector used for feedback may include a diode coupled to an analog peak capture-and-hold circuit for peak power sensing. The pulse detector may also include an analog integration circuit for pulse energy measurements. Unlike using a solid state laser to generate typical laser pulses, tailored pulse technology using, for example, a fiber laser or master oscillator fiber power amplifier (MOFPA) allows for pulse shapes that are not adequately described by typical peak power, pulse energy, and pulse width metrics. For example, FIGS. 2A and 2B are example temporal pulse shapes of tailored laser pulses generated by a dynamic laser pulse shaper and power amplifier according to one embodiment. As shown in FIG. 2A, a peak power P1 of a leading spike on the power curve does not describe the height of a plateau or "seat" power P2 on the so-called chair-shaped pulse. Further, some tailored pulses may have multiple spikes or multiple plateaus that are not described by the peak power P1. For example, as shown in FIG. 2B, a peak power P1 of a spike does not describe the height of a first plateau power P2 or a second plateau power P3. In addition, as discussed below, a pulse width based on a FWHM metric may provide the same result for a plurality of chair-shaped pulses with different "seat" lengths.

SUMMARY OF THE DISCLOSURE

A system and method for processing a workpiece with a laser includes selecting a target to process that corresponds to a target class associated with a predefined temporal pulse profile that is tailored for the types of targets included within the target class. The method includes generating a laser pulse based on laser system input parameters configured to shape the laser pulse according to the predefined temporal pulse profile, detecting the generated laser pulse, comparing the generated laser pulse to the predefined temporal pulse profile, and adjusting the laser system input parameters based on the comparison.

The target class may include, for example, alignment features used during an alignment scan or electrically conductive link structures. To sever electrically conductive link structures, for example, a first portion of the predefined temporal pulse profile during a first time duration may include a power spike, a second portion of the predefined temporal pulse profile during a second time duration may include a power plateau, and the first time duration may be substantially shorter than the second time duration. In some embodiments, the power level of the predefined temporal pulse profile slopes at a predetermined rate during the second time duration. Of course, other temporal pulse profiles may also be used. For example, the first portion of the predefined temporal pulse profile may include a first spike and the second portion may include a second spike.

In some embodiments, detecting the laser pulse comprises splitting the laser pulse to illuminate both a pulse detector and the selected target. The pulse detector may be configured to sample the detected laser pulse to generate a digital representation thereof.

In certain embodiments, comparing the detected laser pulse includes measuring one or more characteristics of the detected laser pulse, such as a peak pulse power, a pulse rise time, and a pulse duration. Measuring the pulse duration may include, for example, determining a time interval between a first time and a last time when the pulse power approximately equals a predetermined percentage of the peak pulse power. Measuring the pulse duration may also include, for example, determining a time integral squared ($T_{IS}$) pulse duration defined by the equation:

$$T_{IS} = \frac{\left(\int I(t)dt\right)^2}{\int I^2(t)dt},$$

where I(t) is the pulse curve in power versus time.

The method also includes, in certain embodiments, determining a statistical metric of the detected laser pulse as compared to the predefined temporal pulse profile associated with the target class. The statistical metric may include, for example, a standard deviation, a standard deviation of a time derivative, a root-mean-square (RMS), and an integral of an absolute error.

In certain embodiments, measuring the laser pulse includes characterizing a spike corresponding to the first portion of the predefined temporal pulse profile by measuring a peak height corresponding to a maximum power of the spike. Such a method may also include measuring a peak width corresponding to a time interval between a first time and a last time that the spike's power approximately equals a predetermined power level between the peak height of the spike and a maximum power level corresponding to the second portion of the predefined temporal pulse profile. The method may also include measuring a peak time corresponding to an average of a first time and a last time that the spike's power approximately equals a predetermined percentage of the peak height of the spike.

In certain embodiments, measuring includes characterizing at least one of a plateau and a slope corresponding to the second portion of the predefined temporal pulse profile.

Additional aspects and advantages will be apparent from the following detailed description of preferred embodiments, which proceeds with reference to the accompanying drawings.

BRIEF DESCRIPTION OF THE DRAWINGS

FIGS. 9A and 9B illustrate a problem stemming from using peak power and FWHM to characterize tailored laser pulses.

DETAILED DESCRIPTION OF PREFERRED EMBODIMENTS

Figure 1A:
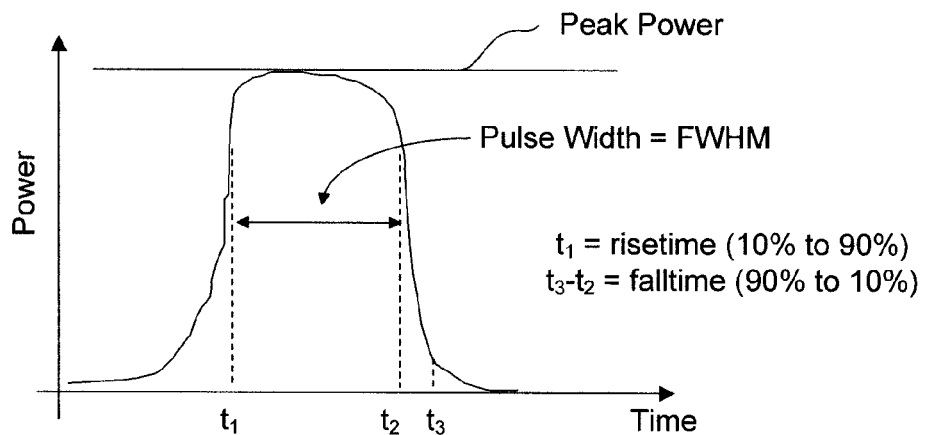
FIGS. 1A and 1B are example temporal pulse shapes of laser pulses generated by typical solid state lasers.
Figure 1B:
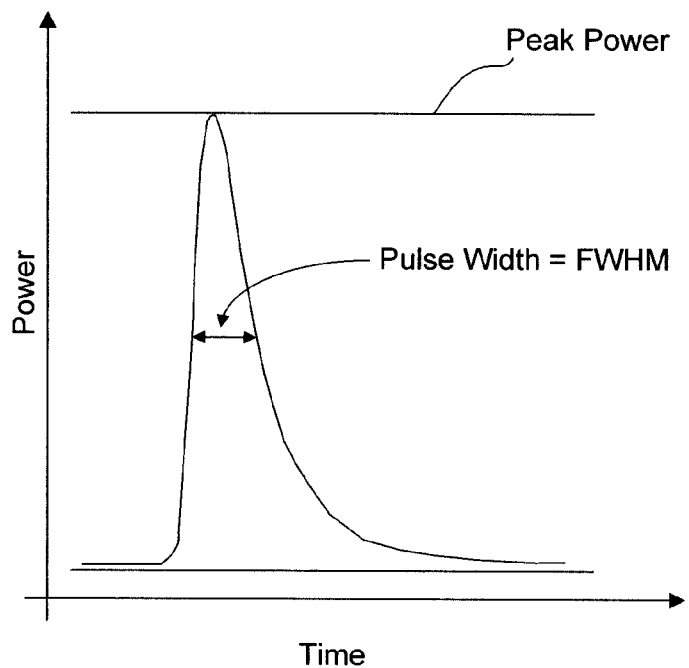

This disclosure describes selecting laser pulses with tailored intensity profiles based on target structures, and providing sufficient feedback and control so as to maintain a desired intensity profile. In one embodiment, a laser processing system uses multiple temporal profiles to process workpiece structures (e.g., electrically conductive links) on one or more workpieces. The laser processing system may include a pulsed laser such as a fiber laser, a master oscillator fiber power amplifier (MOFPA), a tandem photonic amplifier, or a "sliced" pulse laser that uses an electro-optical modulator (see the description herein related to FIGS. 18 and 19) with programmable temporal pulse profiles that allow the laser to generate laser pulses in a wide range of shapes. The laser processing system may be configured to select a laser pulse shape "on-the-fly" when the laser is directed to emit a laser pulse toward a specific workpiece structure.

In certain embodiments, the laser processing system calibrates the energy per pulse and other laser parameters, such as signal propagation delays, which may vary with the programmed temporal profile. The laser processing system may be calibrated to operate reliably over a range of programmed temporal pulse profiles. Thus, in one such embodiment, the laser processing system uses a photoelectronic detection method that digitizes the pulse waveform so as to provide an accurate calibration of the energy per pulse as a function of the programmed pulse shape. As discussed above, a typical Q-switched solid state pulse shape is well described by its peak power, pulse energy, and pulse width (e.g., FWHM). Generally, however, these metrics are not sufficient for describing the temporal pulse shapes possible with a tailored pulse laser. For example, the peak power of a spike on the power curve does not describe the height of a "seat" on the so-called chair-shaped pulse or the height of a second peak on a double spiked pulse. Thus, in certain embodiments, the laser processing system includes feedback for parameters that typical link processing systems do not monitor. By providing such feedback, a number of pulse shape metrics may be logged and correlated with process feedback (e.g., device yield and substrate damage). This provides a valuable tool for developing new processes and new pulse shapes to further enhance the value of the tailored pulse technology. In addition, or in other embodiments, the pulse shape metrics are used to monitor and control the pulse shapes based on the feedback.

Reference is now made to the figures in which like reference numerals refer to like elements. In the following description, numerous specific details are provided for a thorough understanding of the embodiments disclosed herein. However, those skilled in the art will recognize that the embodiments can be practiced without one or more of the specific details, or with other methods, components, or materials. Further, in some cases, well-known structures, materials, or operations are not shown or described in detail in order to avoid obscuring aspects of the embodiments. Furthermore, the described features, structures, or characteristics may be combined in any suitable manner in one or more embodiments.

I. Programmable Temporal Pulse Profiles

In one embodiment, a laser processing system is configured to select a first temporal pulse profile for a first type of structure on a workpiece and a second temporal pulse profile for a second type of structure on the workpiece. A temporal pulse profile used for processing a particular integrated circuit feature, such as a link on a semiconductor memory device, may be inefficient or ineffective for performing a separate laser processing operation on the same device. Thus, the laser processing system provides on-the-fly selection of appropriate temporal pulse profiles based on the type of target structure being processed.

Figure 2A:
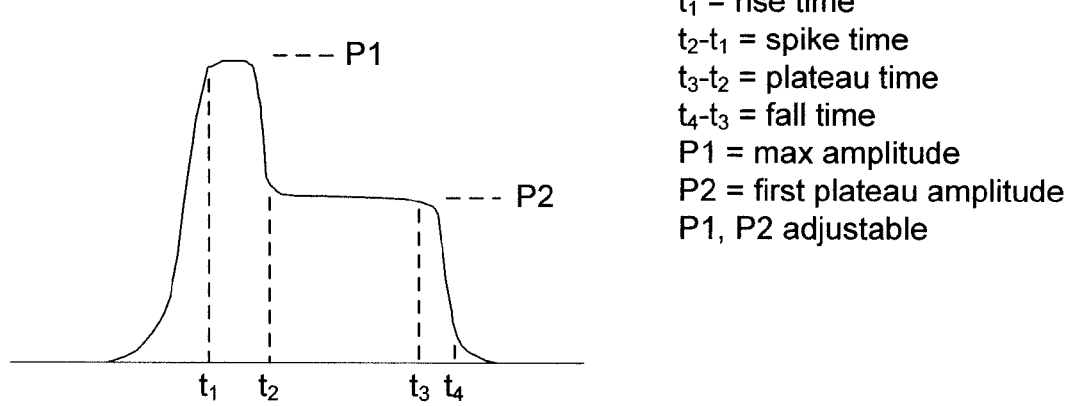
FIGS. 2A and 2B are example temporal pulse shapes of tailored laser pulses generated by a dynamic laser pulse shaper and power amplifier according to one embodiment.
Figure 3:
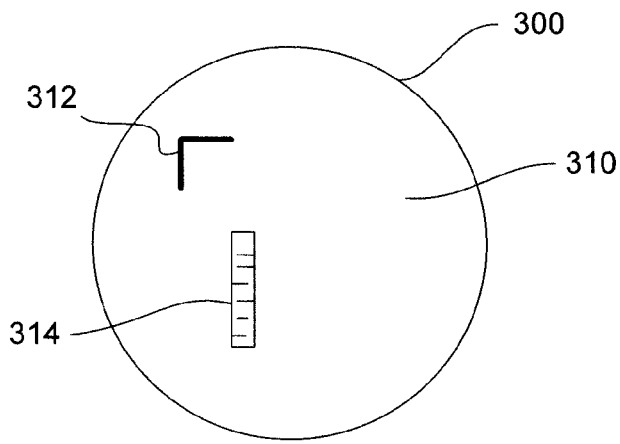
FIG. 3 is a schematic diagram illustrating a semiconductor wafer having on its work surface a target alignment feature and electrically conductive link structures according to one embodiment.

For example, FIG. 3 is a schematic diagram illustrating a semiconductor wafer 300 having on its work surface 310 a target alignment feature 312 and electrically conductive link structures 314 according to one embodiment. A shaped laser pulse with a high pulse energy and a high peak power resulting from a leading edge spike (e.g., see FIG. 2A) may be useful for selectively blowing one or more of the link structures 314. However, the high pulse energy and/or high peak power may cause damage to the target alignment feature 312 during alignment scans, which may then result in erroneous position information derived from such scans. Thus, the laser processing system may be operated in a first temporal pulse profile mode that produces pulses with relatively lower pulse energy and peak power for target scans, and a second temporal pulse profile mode that produces pulses with relatively higher pulse energy and peak power for blowing the link structures 314.

As those skilled in the art will appreciate, a wide range of peak powers, pulse energies, and temporal profiles may be attractive for laser processing of structures on a workpiece. A tailored pulse shape may be employed, for example, to sever electrically conductive link structures in a wide array of semiconductor memory devices, including DRAM, SRAM, and flash memory; to produce laser drilled micro-vias in flexible circuits, such as copper/polyamide layered materials, and in integrated circuit (IC) packages; to accomplish laser processing or micromachining of semiconductors, such as laser scribing or dicing of semiconductor integrated circuits, silicon wafers, and solar cells; and to accomplish laser micromachining of metals, dielectrics, polymeric materials, and plastics. One skilled in the art will recognize that many other types of workpieces and/or workpiece structures may be processed according to the embodiments disclosed herein.

Figure 4:
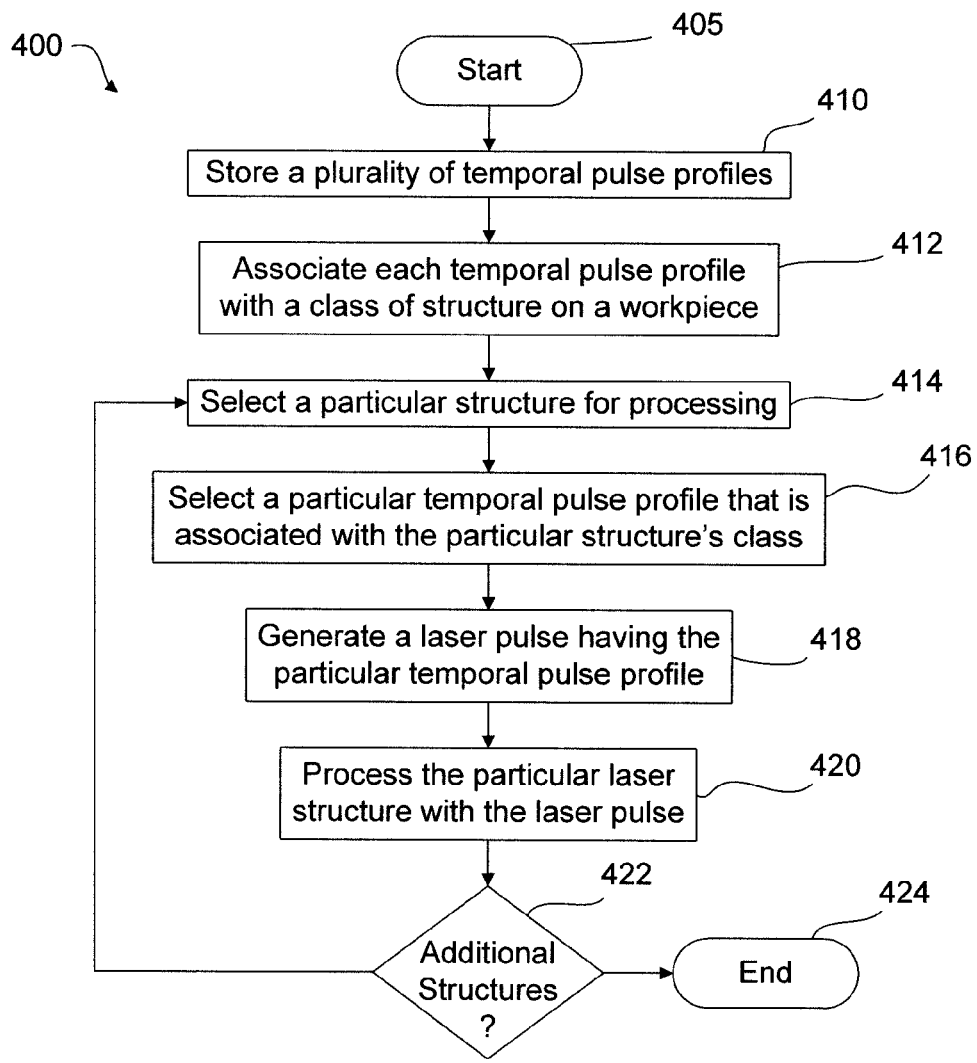
FIG. 4 is a flow chart of a method for laser processing of structures on or in a workpiece according to one embodiment.

Thus, in one embodiment, the laser processing system allows a user to program a temporal pulse profile for processing a specific type or class of structures. For example, FIG. 4 is a flow chart of a method 400 for laser processing of structures on or in a workpiece according to one embodiment. After starting 405, the method 400 includes storing 410 a plurality of user-defined temporal pulse profiles, and associating 412 each of the temporal pulse profiles with a type or class of structure on a workpiece or group of workpieces. The class of structures may include, for example, alignment structures, electrically conductive links, and resistors or other discrete components. In some embodiments, the class may also include, for example, a scribe line or kerf cut into the workpiece with the laser.

When processing workpieces, the method 400 includes selecting 414 a particular structure on or within a workpiece for processing, and selecting 416 a particular temporal pulse profile from the plurality of temporal pulse profiles that is associated with the particular structure's class. The method 400 also includes generating 418 a laser pulse having the particular temporal pulse profile, and processing 420 the particular structure with the generated laser pulse. An artisan will recognize from the disclosure herein that instead of using a single pulse to process the particular structure, the laser processing system may direct multiple pulses to the particular structure. Further, each of the pulses directed to the particular structure may have the same temporal pulse profile, or at least one of the pulses may have a different temporal pulse profile.

The method 400 then queries 422 whether the workpiece includes additional structures to process. If there are additional structures to process, the method 400 then selects 414 another particular structure for processing. Thus, the method 400 provides on-the-fly processing of structures using a plurality of different temporal pulse profiles based on the type of structure. If there are no additional structures to process, the method 400 ends 424.

II. Example Laser Processing System

Figure 5:
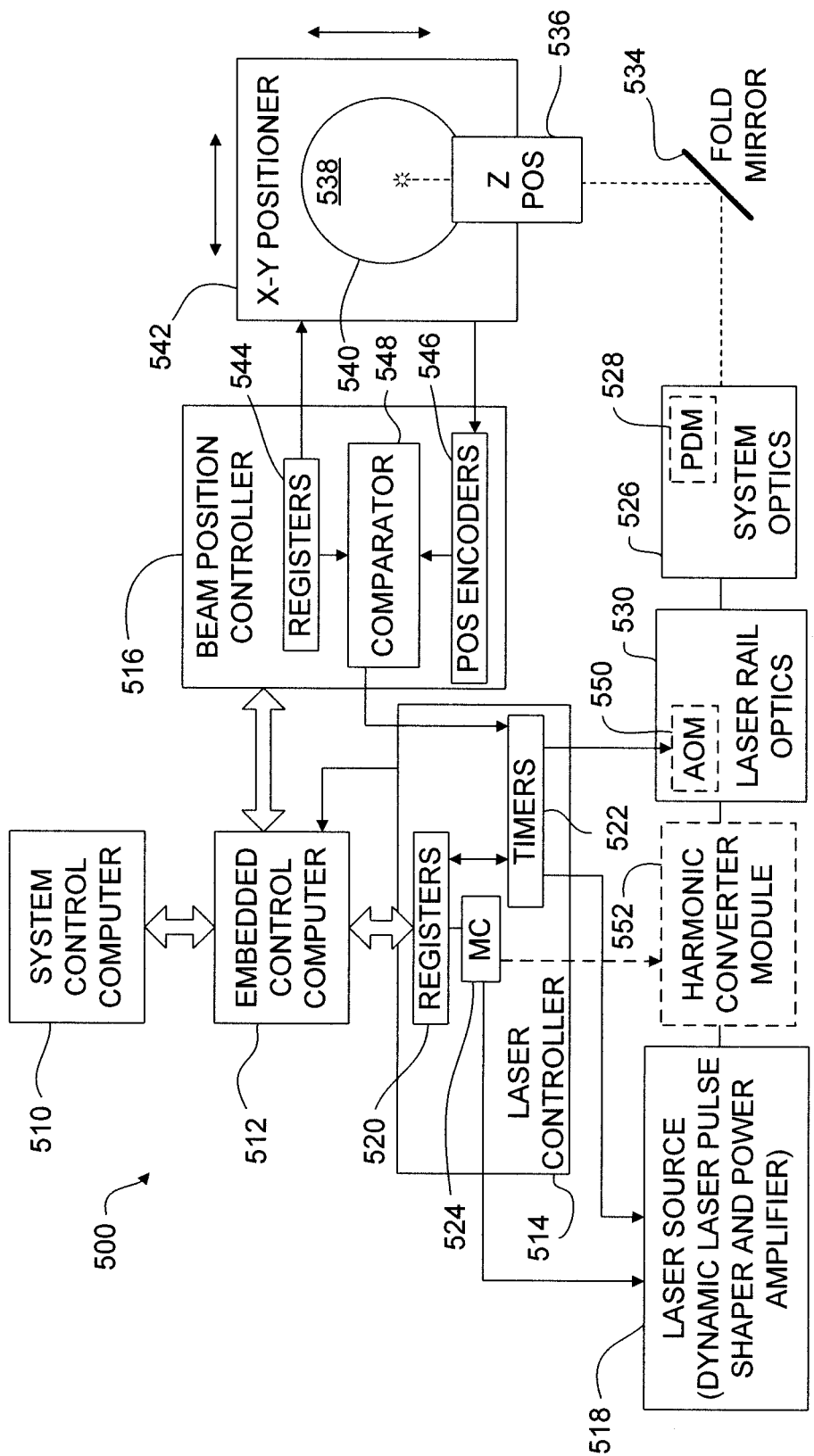
FIG. 5 is an example laser processing system for generating and monitoring laser pulses with different temporal pulse profiles according to one embodiment.

FIG. 5 is an example laser processing system 500 for generating and monitoring laser pulses with different temporal pulse profiles according to one embodiment. The system 500 includes a system control computer 510 to provide an embedded control computer (ECC) 512 overall system operational commands to which a laser controller 514 and a beam position controller (BPC) 516 respond. The system 500 also includes a laser source 518 that is controlled by the laser controller 514, which includes command and data registers 520 and timers 522 that directly or indirectly communicate with the ECC 512 and the BPC 516. As discussed in detail below, in one embodiment, the laser source 518 includes a dynamic laser pulse shaper and fiber power amplifier. In another embodiment, the laser source 518 includes a tandem amplifier. In yet another embodiment, the laser source 518 includes "sliced" pulse laser that uses an electro-optical modulator (see the description herein related to FIGS. 18 and 19).

Figure 2B:
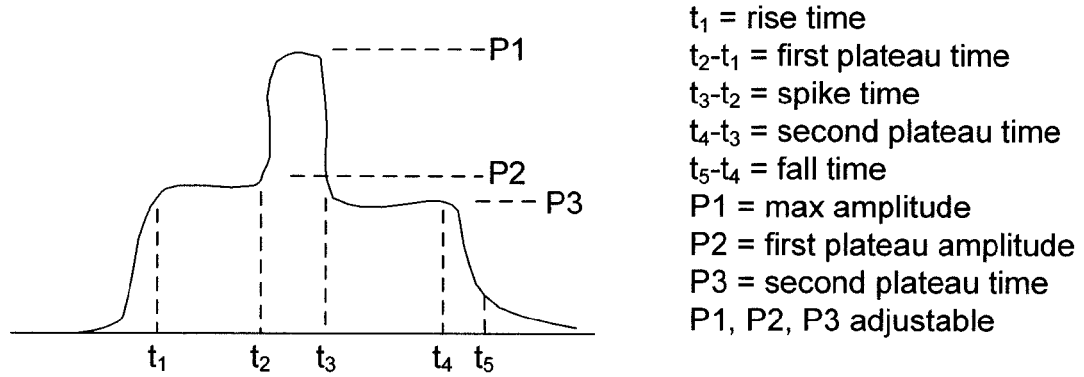

The laser controller 514 receives commands from the ECC 512 and signals from the BPC 516. The laser controller 514 provides commands to the laser source 518 for pulse emission (through external trigger commands) and pulse shape control. In one embodiment, the laser controller 514 receives commands from the ECC 512, and responds to the commands by issuing external trigger commands to the laser source 518 from a modulator controller (MC) 524 in coordination with the BPC 516 based on workpiece feature position data. The MC 524 controls the times of emission and shapes of pulses emitted by laser source 518. Alternatively, the laser source 518 emits pulses with an interpulse time that is communicated to the laser controller 514, the ECC 512, or both. In one embodiment, depending on the type of workpiece feature on which the emitted laser pulse will be incident, the laser source 518 is commanded by the ECC 512 to produce a specific temporal pulse profile. Illustrative examples of such temporal profiles are shown in FIGS. 2A and 2B.

To provide programmable temporal pulse profiles, according to one embodiment, the system 500 provides instrumentation for satisfactory measurement and calibration of a range of pertinent laser process parameters, such as temporal profile, energy per pulse, focused beam propagation attributes, and other parameters discussed below. As shown in FIG. 5, system optics 526 may include a photodetection module 528, which may be employed for the detection of incident laser output and of laser output reflected from the work surface. In one embodiment, the photodetection module 528 includes a photodetector circuit capable of fine digitization of the detected light signals, such as the incident and reflected laser output signals, thereby allowing for the incident and reflected pulse waveforms to be effectively digitized. Thus, the system 500 allows for satisfactory measurement of the incident and reflected laser waveforms, allowing calculation and calibration of the temporal profile, temporal profile variation, pulse amplitude stability, pulse energy stability, and the energy per pulse. As those skilled in the art will recognize, scanning the laser beam across a target area of sharply varying reflectivity at the laser wavelength provides a method for measurement and calculation of the focused spot size attributes of the laser beam.

Figure 6:
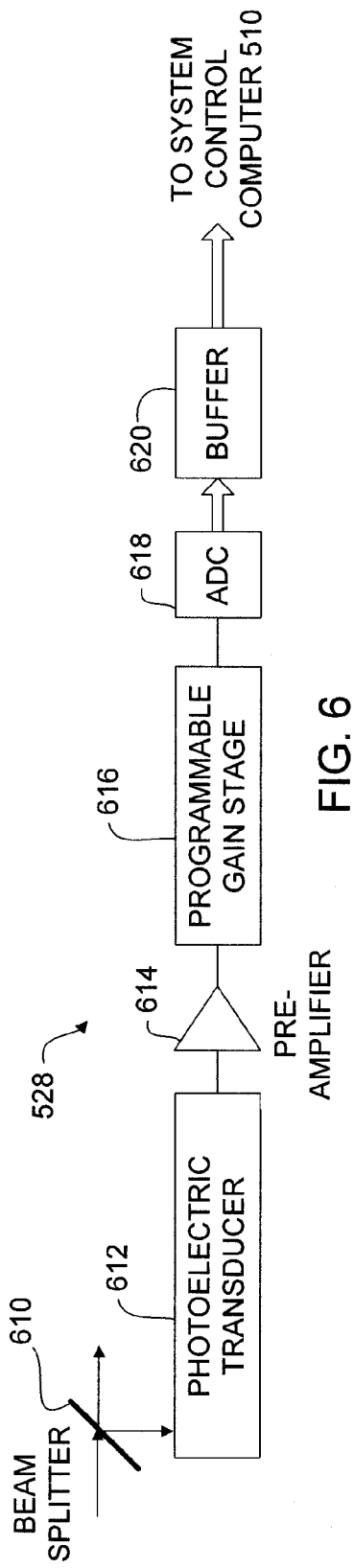
FIG. 6 is a block diagram of an example photodetection module according to one embodiment.

FIG. 6 is a block diagram of an example photodetection module 528 according to one embodiment. The photodetection module 528 includes an optical beam splitter 610 to split off a portion of the output from laser rail optics 530 shown in FIG. 5 onto a photoelectric transducer 612 connected to a signal conditioning pre-amplifier 614. The pre-amplifier 614 is connected to a programmable gain stage 616, which feeds into a high-speed analog-to-digital converter (ADC) 618. The digitized output of the ADC 618 is buffered by a circular buffer 620 for later transfer to the system control computer 510 shown in FIG. 5.

The photoelectric transducer 612 may be chosen for sensitivity to a particular laser wavelength, for a temporal response characteristic that is consistent with the temporal profile of the shaped laser pulses, and/or for a dynamic range consistent with the anticipated range of intensities of optical radiation to which it will be exposed. The programmable gain stage 616 serves to compensate for the variable optical attenuation implemented in the laser rail optics 530 if the attenuation is implemented prior to the point where the beam is sampled by the photoelectric transducer 612. Attenuating the beam to reduce power at the work surface would also reduce the amount of power incident on the photoelectric transducer 612. The programmable gain stage 616 electrically restores the signal level to maximize the resolution of the signal as sampled by the ADC 618.

The ADC 618 may be chosen for a sample rate and slew rate sufficiently high so as to resolve the anticipated pulse profiles. A flash converter architecture may be used, but because the function may be continuously sampling data, pipelining and/or successive approximation technologies are also suitable and may provide better performance metrics. The conversion width of the ADC (e.g., 8-bit, 12-bit, 16-bit or more) may be chosen based on the desired resolution and dynamic range capabilities of the system 500.

The digitized samples of the detected signal are continuously transferred into the circular buffer 620. The buffer 620 may be sufficiently sized so as to store the entire pulse from start to finish with at least enough excess capacity to account for latency in analysis of the data by pulse detection logic. In real time, a pulse detector logic function analyzes the digitized pulse waveform to detect the presence of a pulse in the buffer 620. When the pulse is detected and determined to be complete, this function stops the action of continuing to update the buffer 620 and holds the buffer 620 for later upload to the system control computer 510. The digitization and storage function may later be "re-armed" by a subsequent command from the system control computer 510. The pulse detector logic function may be implemented using a digital signal processor (DSP), a field programmable gate array (FPGA), or other computational engine. An FPGA implementation may include both DSP and buffer memory elements in a single device.

Once a complete pulse has been stored in the circular buffer 620, it can be uploaded to the system control computer 510 for analysis. Analysis may include, for example, determination of peak height, determination of pulse energy by integrating the profile of the pulse, determination of pulse width, and characterization of pulse profile as discussed in detail below.

In addition, or in another embodiment, the DSP, FPGA, or other computation engine might also implement a combination of the pulse characterization metric computations. In such an embodiment, the system 500 may choose not to upload the raw digitized pulse data to the system control computer 510, but instead only upload some subset of the pulse characterization metrics. An advantage of this embodiment is to reduce bandwidth requirements of the connection between the photodetection module 528 and the system control computer 510, which allows more measurements to be made faster while maintaining a relatively simple electrical interface.

Returning to FIG. 5, in one embodiment of the laser processing system 500, the output from the laser source 518 is applied to the laser rail optics 530 and the system optics 526. Output from the system optics 526 is directed by a fold mirror 534 toward a Z-positioning mechanism 536, which may incorporate a lens assembly, for subsequent delivery to a work surface 538 of a target specimen 540 for laser processing of workpiece features (e.g., the target alignment feature 312 and the link structures 314 shown in FIG. 3). The BPC 516 provides X-Y coordinate positioning signals to direct an X-Y positioning mechanism 542 to a location where the output from the Z-positioning mechanism 536 can process a desired target feature. The X-Y positioning mechanism 542 receives command position signals from registers 544 of the BCP 516 and directs actual position signals to position encoders 546 of the BCP 516, which includes a comparator module 548 that determines a position difference value and sends it to the timers 522. The timers 522 respond by sending a trigger signal appropriately timed to operate in the laser rail optics 530 an acousto-optic modulator (AOM) 550 that modulates the output from the laser source 518. Those skilled in the art will recognize that the pulse output from laser source 518 may be directed into a harmonic conversion module 552 and subsequently delivered by way of the laser rail optics 530 and the system optics 526 to the work surface 538 for harmonic laser processing of workpiece features.

Those skilled in the art will recognize that alternative arrangements of laser processing system elements may be employed and a wide variety of workpieces may be processed by the laser processing system 500.

Figure 7A:
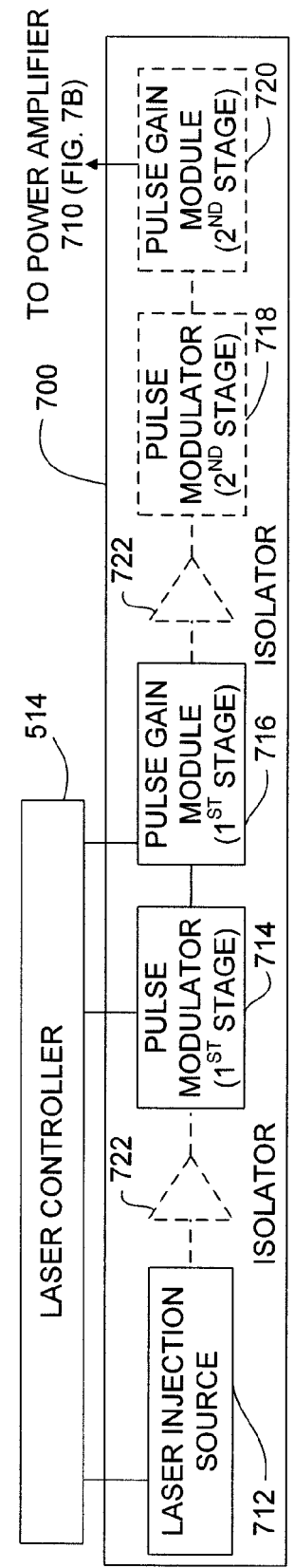
FIGS. 7A and 7B are block diagrams illustrating the laser source shown in FIG. 5 according to one embodiment.
Figure 7B:
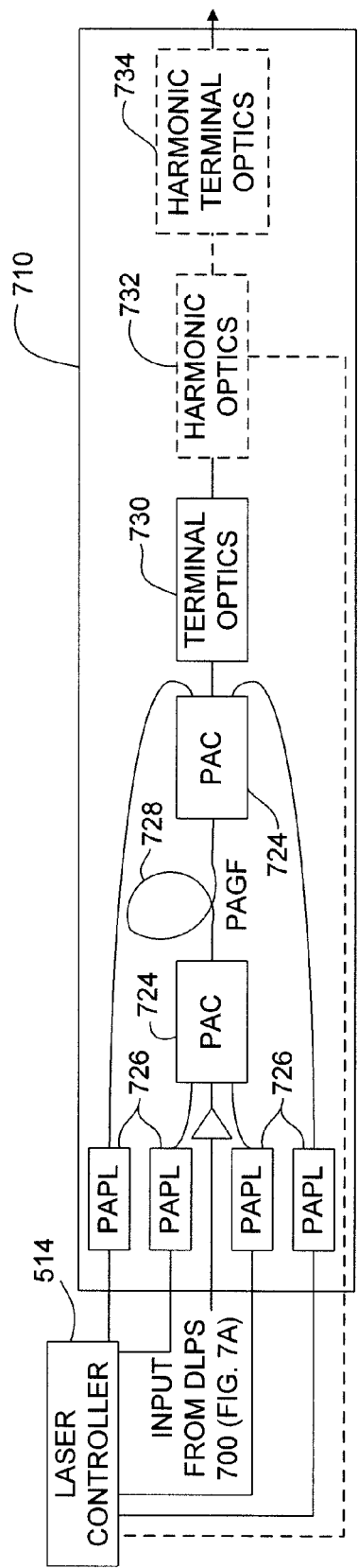

FIGS. 7A and 7B are block diagrams illustrating the laser source 518 shown in FIG. 5 according to one embodiment. A similar laser source is described in detail in U.S. Patent Application Pub. No. 2006-0159138, titled "Pulsed Laser Light Source," by Deladurantaye et al. FIG. 7A illustrates a dynamic laser pulse shaper (DLPS) 700, and FIG. 7B illustrates a fiber power amplifier (FPA) 710. As shown in FIG. 7A, the DLPS 700 includes a laser injection source 712, a first pulse modulator 714, and a first pulse gain module 716. In some embodiments, the DLPS 700 also includes a second pulse modulator 718 and a second pulse gain module 720. The DLPS 700 may also include one or more isolators 722 (two shown) between elements. As those skilled in the art will appreciate, several alternative arrangements of the modulator and gain elements may be advantageously employed.

The laser injection source 712 emits a continuous wave (CW) output that is then modulated by the first pulse modulator 714 to produce a suitable first laser pulse profile as commanded by the laser controller 514. In another embodiment, the laser injection source 712 may produce a pulsed output. The first pulse modulator 714 may be an electro-optic modulator, an acousto-optic modulator, or other optical modulator. The laser pulse produced by the first pulse modulator 714 is then transformed by the first pulse gain module 716 to produce a transformed temporal pulse output that is suitable for amplification and subsequent delivery through the laser rail optics 530 and system optics 526 to the work surface 538 for laser processing of workpiece features.

The laser controller 514 may be programmed with a matrix of command signals for input to the first pulse modulator 714 to produce a range of laser pulse profiles that, when subsequently input to the first pulse gain module 716, result in the production of transformed laser pulse profiles desired as output from the DLPS 700. Accordingly, the system control computer 510 may then select the temporal pulse profile output from the DLPS 700 as a function of a workpiece feature to be processed through commands issued to the ECC 512, which in turn issues commands to the laser controller 514. As shown in FIG. 7A, the DLPS 700 may, in some embodiments, include the second pulse modulator 718 and the second pulse gain module 720 to provide additional or more complex shaping of the temporal pulse profile output from the DLPS 700.

In one embodiment, the transformed pulse output from the DLPS 700 is injected into the FPA 710 shown in FIG. 7B. The FPA 710 includes power amplifier couplers (PACs) 724 (two shown) that allow injection of the DLPS's output and output from power amplifier pump lasers (PAPLs) 726 (four shown) into a power amplifier gain fiber (PAGF) 728. The laser controller 514 is connected to the PAPLs 726 and may, for example, control the PAPLs' current (e.g., through a diode laser or a semiconductor laser), control the PAPLs' temperature (e.g., through a thermo-electrical cooler), and/or monitor the PAPLs' power (e.g., through a photodiode). The PACs 724 may be placed at either or both ends of the fiber. Multiple additional PACs may be spliced into the length of the PAGF 728. The PAGF 728 is preferably a large mode area (LMA) polarization maintaining fiber. The PAGF 728 may include frequency selecting structures. The PAGF 728 in one embodiment is a waveguide device with a silica fiber core doped with rare earth ions and clad with one or more concentric sheaths of optical material. The PAGF 728 in another embodiment includes concentric cladding sheaths that have regions doped with rare earth ions. The PAGF 728 in yet another embodiment is a photonic crystal fiber in which the cladding sheath or sheaths include a highly periodic distribution of air holes. In another embodiment, the PAGF 728 is a single-mode polarization maintaining fiber. Those skilled in the art will recognize that the number of PAPLs 726 used is determined by the type and length of the PAGL 728 and the desired optical pulse output characteristics from the FPA 710. The output from the PAGF 728 may be collimated and polarized, as may be required by terminal optics 730.

In one embodiment, output pulses from the FPA 710 are provided through the terminal optics 730, harmonic optics module 732, and optional harmonic terminal optics 734. The harmonic optics module 732 includes nonlinear crystals for the conversion of the incident output pulse to a higher harmonic frequency through the well-known method of harmonic conversion. In an example embodiment, for harmonic conversion of 1064 nm output from the FPA 710 to 355 nm, the harmonic optics module 732 includes Type I non-critically phase-matched lithium triborate (LBO) crystal for second harmonic generation (SHG) conversion followed by a Type II, sum frequency generation LBO crystal cut for 1064 nm plus 532 nm to 355 nm harmonic conversion. In another example embodiment, for conversion to 266 nm, the THG LBO crystal may be replaced by a critically phase-matched Beta-Barium Borate (BBO) crystal. In yet another example embodiment, for fourth harmonic generation (FHG) conversion to 266 nm, cesium lithium borate (CLBO) may be used. One skilled in the art will recognize from the disclosure herein that the harmonic optics module 732 may also include focusing lens elements. The elements in the harmonic optics module 730 may be placed into temperature controlled mounts that has a temperature set and controlled by the laser controller 514 using active and/or passive feedback loops so as to precisely control phase-matching temperatures.

III. Pulse Shape Feedback and Control

As discussed above, tailored pulse profiles are generally not adequately described by peak power, pulse energy, and pulse width metrics. Thus, certain embodiments described in detail below provide pulse shape feedback (e.g., sensing) and control. The embodiments include specific types of feedback and example feedback methods. Pulse shape control and control algorithms are also described.

When processing workpieces with tailored laser pulses, it may be desirable to reproduce pulse shapes from one link processing system to another, to maintain pulse shapes over time, and to provide pulse-shape related statistical feedback suitable for correlating with process trends. Thus, in one embodiment, a laser processing system provides pulse-shape feedback that goes beyond the typical peak height, pulse energy, and pulse-width solution generally used for solid state lasers. In one embodiment, the laser processing system includes an inline pulse profiler that is configured to monitor the pulse shape at runtime. Data collected by the pulse profiler are processed through a set of predetermined algorithms to compute metrics on the pulse shape and/or deviation from a nominal pulse shape. The data and statistical results are available for creating and maintaining reproducible pulse shapes and statistical analysis of pulse shapes. The data and statistical results may also be available for pulse shape control, as described below.

A. Feedback Metrics

The following example metrics may be used to specify and analyze temporal pulse profiles. Temporal pulse profiles may be defined as a combination of several parameters corresponding to pulse features such as spikes, plateaus, and slopes. For example, a chair-shaped pulse includes an initial peak or spike followed by a plateau. An artisan will recognize from the disclosure herein that additional features may also be defined.

While it may be desirable to specify all aspects of the pulse shape, a limited set of parameters are controlled in certain embodiments to generate tailored pulses. For example, in one embodiment, there are about twelve variables that may be adjusted to generate pulse shapes, and several of these parameters may not be used when specifying shorter pulses. The number of controlled parameters may depend on the laser's ability to response to the parameters.

In one embodiment, temporal pulse profiles are defined by general parameters such as rise time and pulse duration. These parameters fall into two different categories consisting of overall pulse parameters and feature defining parameters. Overall pulse parameters are metrics that apply to the whole pulse shape such as rise time, total pulse duration, and overall peak time. Feature defining parameters are metrics that apply to portions of the pulse shape such as the time, height, and width of peaks or the start, stop, and height of plateaus.

1. Overall Pulse Parameters

The following example feedback metrics apply to an overall pulse shape.

(i) Peak Pulse Power

Figure 8:
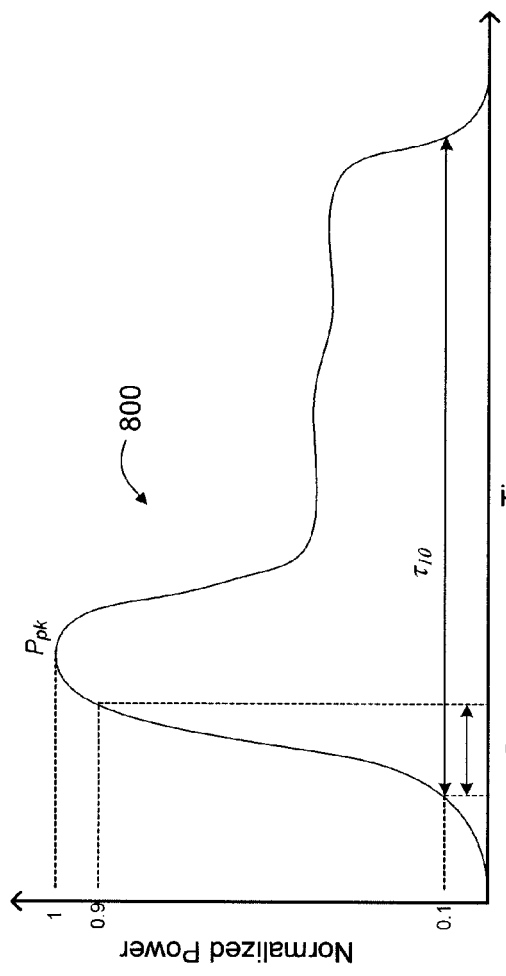
FIG. 8 graphically illustrates a normalized tailored laser pulse characterized, at least in part, by a peak pulse power according to one embodiment.

FIG. 8 graphically illustrates a normalized tailored laser pulse 800 characterized, at least in part, by a peak pulse power $P_{pk}$ according to one embodiment. Pulse shapes may be normalized relative to a peak pulse power to ease amplitude specifications for peaks and plateaus. The peak pulse power $P_{pk}$ is defined as the maximum power any time during the pulse. The peak pulse power may be specified with a tolerance for analysis of multiple pulses with the same normalization scaling.

(ii) Pulse Start Time

Generally, feedback metrics are defined such that they may be measured. However, there is often some ambiguity as to the exact moment that a measured pulse commences. Thus, the timing of specific pulse features may be specified relative to a pulse start time that does not have a precisely identifiable time value. For the purpose of measurement and verification, the pulse start time $T_{start}$, which is used to define the timing of pulse features, has no absolute definition. When comparing specifications and measured shapes according to certain embodiments, the start time may be advanced or retarded in order to make the measured shape features best comply with pulse feature specifications.

(iii) Pulse Rise Time

As shown in FIG. 8, a pulse rise time $\tau_R$ according to one embodiment is defined as the time interval to transition from approximately 10% to approximately 90% of the difference between a lower level and an upper level of the normalized power profile. In certain embodiments, the lower level corresponds to zero pulse energy and the upper level corresponds to the height of an initial spike that includes the highest power level of the pulse 800.

(iv) 10% Pulse Duration

As shown in FIG. 8, a 10% pulse duration $\tau_{10}$ according to one embodiment is defined as the maximum time interval between the first and the last point in time that attains 1/10 of the peak pulse power. This definition allows a pulse to drop below 10% of the peak power without defining additional 10% pulse duration sections. This definition is used because peaks and plateaus generally include temporal power variations that may drop below 10%. An artisan will recognize from the disclosure herein that other percentages may also be used depending on the particular application.

(v) Time Integral Squared Pulse Duration

A single tailored pulse may be measured using an oscilloscope with a suitable photodetector. One way to describe the resulting power versus time curve is by the peak height and FWHM values. As discussed above, however, FWHM is not an effective method to compare pulses with significantly different temporal profiles, such as those generated by tailored pulse technology. Rather, what is needed is a way to describe the pulse width of a peak in relation to the resulting effects that will be observed in the material that is to be processed.

FIGS. 9A and 9B illustrate a problem stemming from using peak power and FWHM to characterize tailored laser pulses. FIGS. 9A and 9B each illustrates multiple different temporal pulse shapes generated by, for example, a fiber laser or MOFPA according to certain embodiments (four temporal pulse shapes are shown in FIG. 9A and three temporal pulse shapes are shown in FIG. 9B). Although the peak heights and FWHM values of the four pulses in FIG. 9A are identical, these four pulse shapes yield significantly different results when used for laser processing of electrically conductive links.

FIG. 9B provides another example for shaped pulses with different length "chairs." When the chair height is below the half-maximum value, a significant amount of pulse energy may be added to the pulse (e.g., the length of the "chair" portion of the pulse may be extended out indefinitely) without any change in the FWHM value.

Another accepted industry standard characterization of pulse width, the time integral squared ($T_{IS}$) method, overcomes the limitations of the FWHM method. Thus, in certain embodiments, the feedback metric for tailored pulses includes determining a $T_{IS}$ pulse duration or width, instead of using the common FWHM method. The following equation defines the $T_{IS}$ pulse width:

$$T_{IS} = \frac{\left(\int I(t)dt\right)^2}{\int I^2(t)dt},$$

where l(t) is the pulse curve in power versus time.

The $T_{IS}$ method has been used with 193 nm lithography systems. Pulse shapes of excimer lasers used for 193 nm lithography are oscillatory and may be described as several overlapping peaks that vary in relative intensity over the operating condition of the laser. Because damage to fused silica is a concern at 193 nm, a relevant method was sought to correlate the unusual shape of the 193 nm pulses to the anticipated damage to the silica. The $T_{IS}$ was proven to be effective for predicting compaction of fused silica and is an accepted standard in 193 nm lithography applications.

The $T_{IS}$ value correlates well with other pulse parameters such as energy density, pulse length, and peak power. The $T_{IS}$ method is useful because it captures the relevant characteristics of the pulse much better than does FWHM and allows correlation to the established damage models for fused silica.

Figure 10:
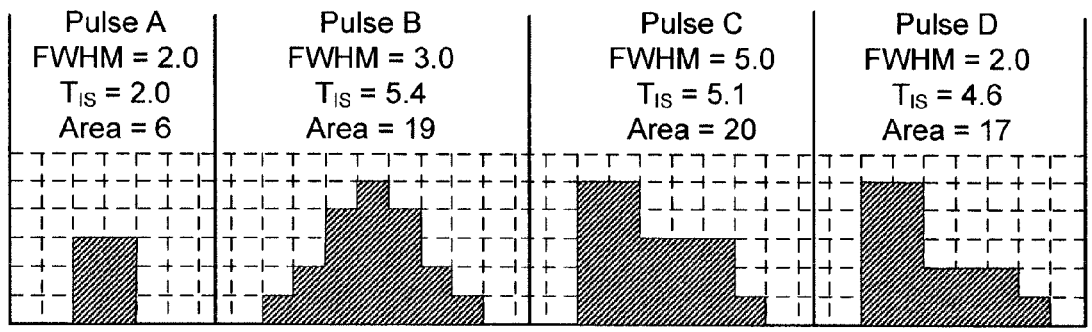
FIG. 10 illustrates four simplified pulse shapes (pulses A-D) and corresponding comparisons between FWHM and $T_{IS}$ pulse width values according to one embodiment.

FIG. 10 illustrates four simplified pulse shapes (pulses A-D) and corresponding comparisons between FWHM and $T_{IS}$ pulse width values. Pulse A shows that for any square pulse, the $T_{IS}$ value is approximately equal to the FWHM value. Pulse B shows that for more Gaussian-like shapes, the $T_{IS}$ is larger than the FWHM value (in this case, the FWHM value is 3.0 units while the resulting $T_{IS}$ pulse width is 5.4 units). Pulses C and D show simplified versions of chair-shaped tailored pulse with the chair height adjusted above and below the half-max power, respectively. For Peak C, the FWHM value and the $T_{IS}$ value are both approximately 5.0 units. Dropping the height of the chair power for Peak D provides a FWHM value of 2.0 units and a $T_{IS}$ value of 4.6 units, suggesting that $T_{IS}$ is a more effective method to capture the materials processing ability of the pulse.

Figure 11:
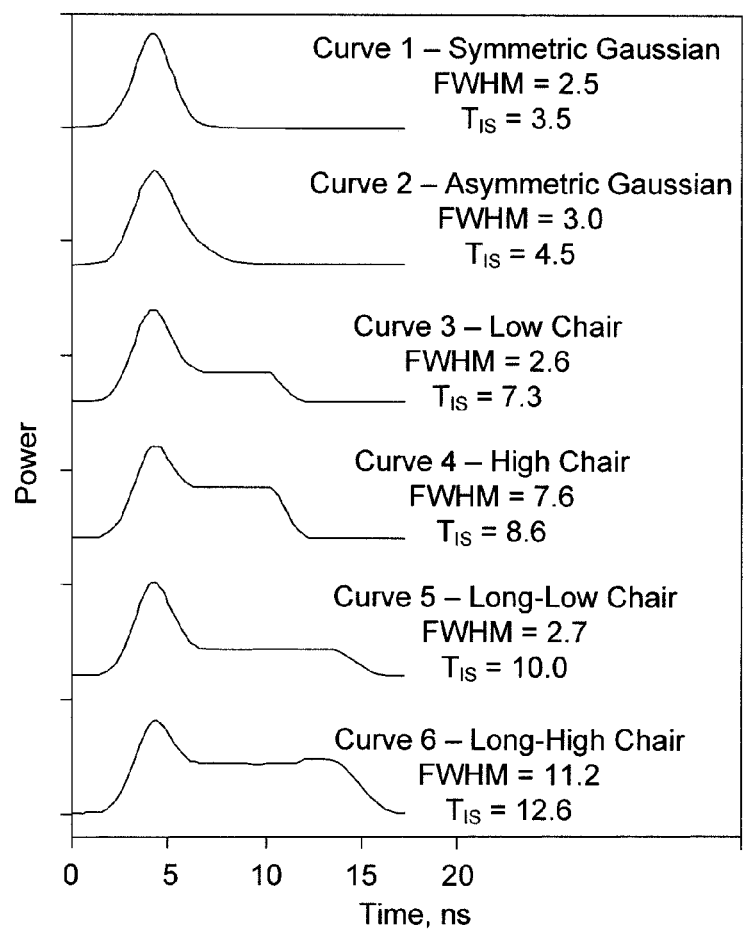
FIG. 11 illustrates six laser pulse shapes (curves 1-6) and corresponding comparisons between FWHM and $T_{IS}$ pulse width values according to one embodiment.

FIG. 11 illustrates six laser pulse shapes (curves 1-6) and corresponding comparisons between FWHM and $T_{IS}$ pulse width values. Curve 1 is a Gaussian shaped pulse with a FWHM value (2.5 ns) that is less than the $T_{IS}$ value (3.5 ns). Curve 2 shows that introducing a slight asymmetry into the pulse trailing edge yields a slightly larger value for $T_{IS}$ (4.5 ns) over that of FWHM (3.0 ns). Curves 3 through 6 are examples of the chair-shaped tailored pulse and demonstrate the advantage of using the $T_{IS}$ method over the FWHM method. This advantage is very apparent when the power of the chair height falls below the half-maximum. Comparing curves 3 and 4 shows that the FWHM value changes from 2.6 ns to 7.5 ns, while the $T_{IS}$ method provides a more reasonable value comparison of 7.3 ns to 8.6 ns, respectively. The same trend is observed for curves 5 and 6. Comparison of curves 3, 4, 5 and 6 also reveals that the $T_{IS}$ pulse width has a more reasonable trend that follows the actual pulse area and more closely relates to the results for laser-materials processing. Thus, in one embodiment, the feedback metric includes determining the $T_{IS}$ value of the generated pulse shape.

(vi) Comparison to a Stored Pulse Shape

In one embodiment, the feedback metric includes a determination of the standard deviation of the generated pulse shape from a stored nominal pulse shape.

(vii) Comparison to a Time Derivative of a Stored Pulse Shape

In another embodiment, the feedback metric includes a determination of the standard deviation of the time derivative of the generated pulse shape from the time derivative of the nominal pulse shape. A comparison of the time derivatives is useful, for example, for analyzing whether the measured pulse shape has a desired rise time. Other statistical metrics that may be used include, but are not limited to, using a root-mean-square (RMS), or an integral of an absolute error.

2. Feature Defining Parameters

The following example feedback metrics apply to specific portions or features of a pulse. In one embodiment, pulses are defined as a combination of characterized spikes, plateaus, and slopes.

(i) Spike Characterization

Figure 12:
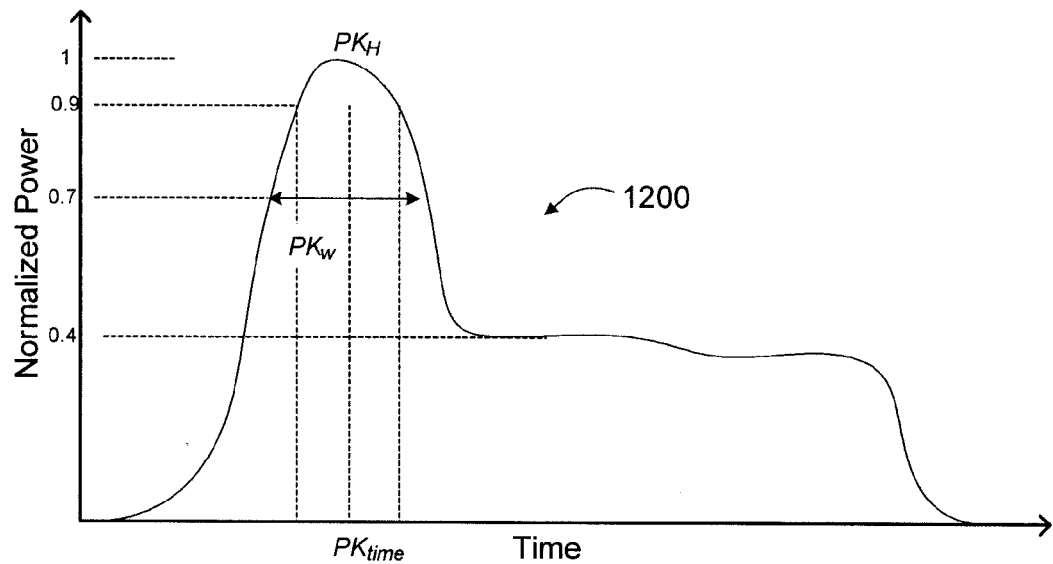
FIG. 12 graphically illustrates a normalized tailored laser pulse having a spike characterized by a peak height, a peak width, and a peak time according to one embodiment.

FIG. 12 graphically illustrates a normalized tailored laser pulse 1200 having a spike characterized by a peak height $PK_H$, a peak width $PK_w$, and a peak time $PK_{time}$ according to one embodiment. The peak height $PK_H$ is defined as the maximum power attained during a time interval containing the spike and no other features (e.g., no other spikes or plateaus). Because a pulse may include multiple spikes, a particular peak height $PK_H$ may differ from the overall pulse height or peak pulse power $P_{pk}$ discussed above in relation to FIG. 8.

The peak width $PK_w$ is defined as the width of the spike from the first time to the last time the spike obtains an amplitude that is mid-way between the peak height $PK_H$ and the amplitude of the highest feature (e.g., plateau) that precedes or succeeds the spike. The peak time $PK_{time}$ is the average of the first and last times that the peak power achieves 90% of the maximum value for that spike. Because it is an average of two times, the peak time $PK_{time}$ does not necessarily occur at the instant that the spike achieves its maximum power.

(ii) Plateau Characterization

Figure 13:
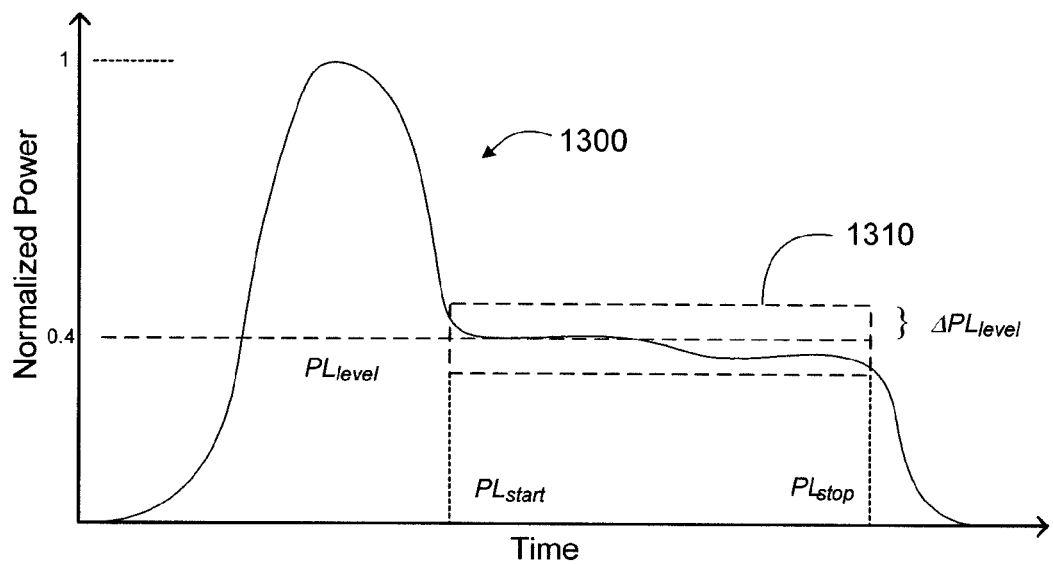
FIG. 13 graphically illustrates a normalized tailored laser pulse having a plateau characterized by a start time, a stop time, and a level associated with a tolerance according to one embodiment.

FIG. 13 graphically illustrates a normalized tailored laser pulse 1300 having a plateau characterized by a start time $PL_{start}$, a stop time $PL_{stop}$, and a level $PL_{level}$ associated with a tolerance $\Delta PL_{level}$ according to one embodiment. The start time $PL_{start}$ and stop time $PL_{stop}$ specify, respectively, the start and stop of the plateau relative to the pulse start time. The start time $PL_{start}$ and stop time $PL_{stop}$ parameters may be specified without tolerances. The plateau level $PL_{level}$ is the expected amplitude. Between the start time $PL_{start}$ and the stop time $PL_{stop}$, the amplitude remains inside of a box 1310 (shown with dashed lines) that is within a specified tolerance $+/-\Delta PL_{level}$ of the plateau.

(iii) Slope Characterization

Figure 14:
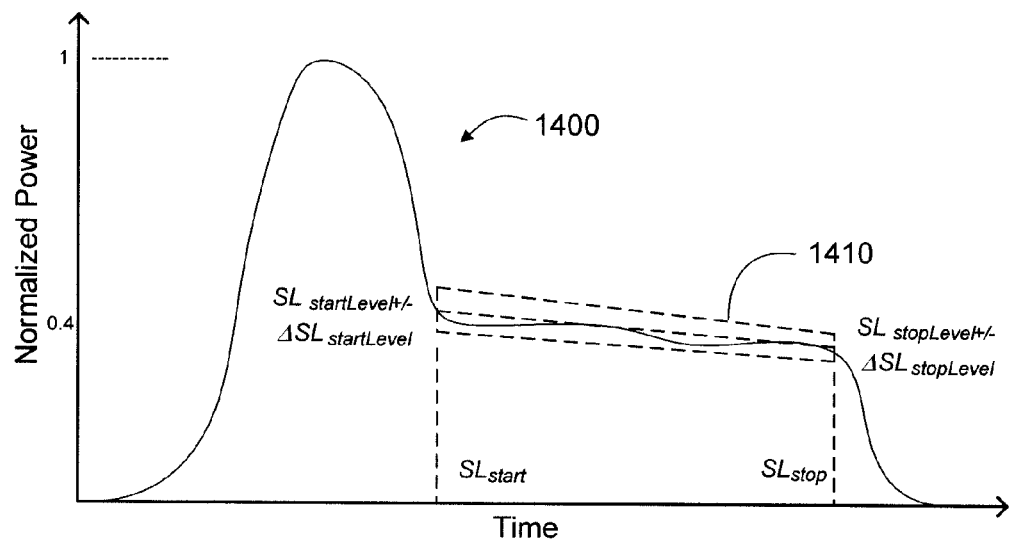
FIG. 14 graphically illustrates a normalized tailored laser pulse having a sloped or tilted plateau characterized by a start time, a stop time, a starting level associated with first a tolerance, and a stopping level associated with a second tolerance according to one embodiment.

FIG. 14 graphically illustrates a normalized tailored laser pulse 1400 having a sloped or tilted plateau characterized by a start time $SL_{start}$, a stop time $SL_{stop}$, a starting level $SL_{startLevel}$ associated with a tolerance $\Delta SL_{startLevel}$, and a stopping level $SL_{stopLevel}$ associated with a tolerance $\Delta SL_{stopLevel}$ according to one embodiment.

The start time $SL_{start}$ and stop time $SL_{stop}$ specify the start and stop of the plateau relative to the pulse start time. These parameters may be specified without tolerances. The start level $SL_{startLevel}+/-\Delta SL_{startLevel}$ is the expected starting amplitude and the stop level $SL_{stopLevel}+/-\Delta SL_{stopLevel}$ is the expected final amplitude. Between the start time $SL_{start}$ and the stop time $SL_{stop}$, the amplitude remains inside of a box 1410 (e.g., trapezoid shown with dashed lines) with end points identified by the starting and finishing level and tolerances.

(iv) Peak Power by Pulse Section

In one embodiment, the feedback metric includes measuring the peak height (power) of various sections of the generated pulse shape. For example, the peaks (e.g., maximum power levels) of the "back" and the "seat" of a chair-shaped pulse may be measured separately and compared to predetermined values for each. As another example, the power of each spike in a multi-spiked pulse may be measured separately and compared to predetermined values for each.

(v) Energy by Pulse Section

In one embodiment, the feedback metric includes measuring the energy of various sections of the generated pulse shape. For example, the energy of the "back" and the "seat" of a chair-shaped pulse may be measured separately and compared to predetermined values for each. As another example, the energy of each spike in a multi-spiked pulse may be measured separately and compared to predetermined values for each.

(vi) Characterization by Binned Shape Information

In one embodiment, the feedback metric includes determining binned shape information. For example, the laser system may have control over twelve time bins that are each approximately 2.5 ns wide. In such embodiments, the feedback includes shape information (e.g., power and energy) that corresponds to the same twelve bins for ease of adjustment.

3. Example Pulse Shape Characterization

Figure 15A:
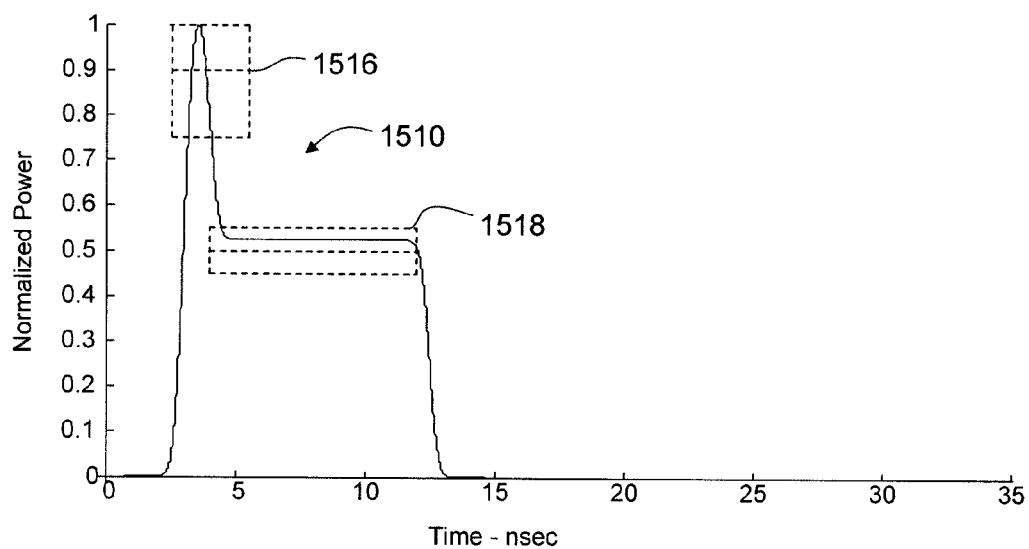
FIGS. 15A, 15B and 15C graphically illustrate example tailored laser pulses having various peaks, plateaus and slopes characterized by the parameters described herein according to certain embodiments.
Figure 15B:
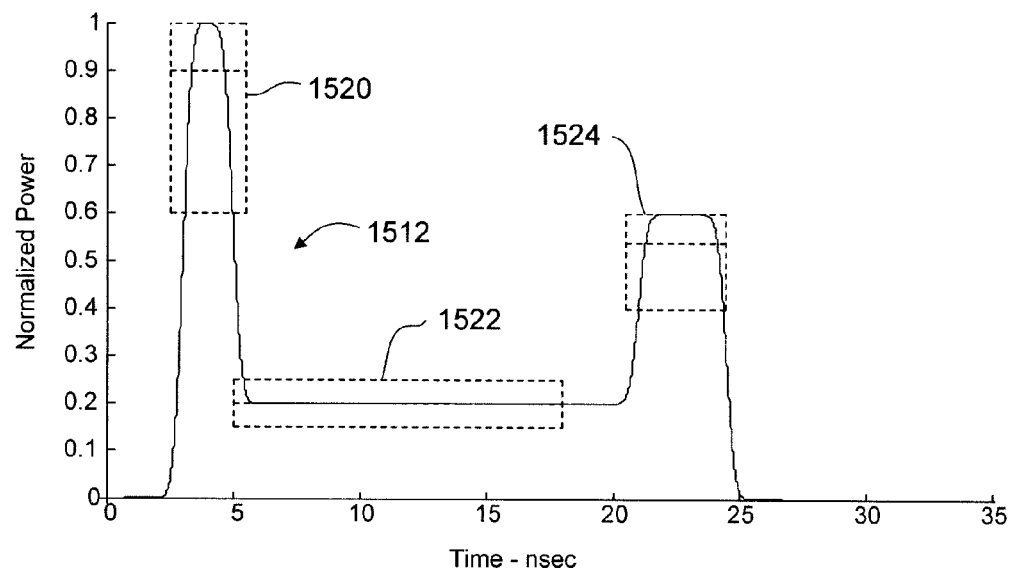
Figure 15C:
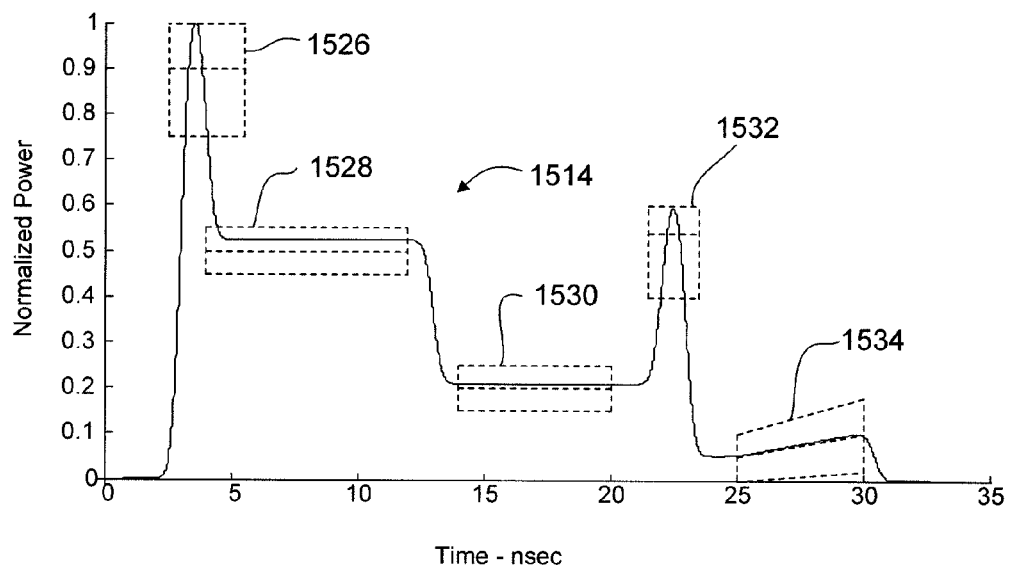

FIGS. 15A, 15B and 15C graphically illustrate example tailored pulses 1510, 1512, 1514 having various spikes, plateaus and slopes characterized by the parameters described herein according to certain embodiments. In FIG. 15A, a spike is defined as being within a set of parameters/tolerances represented by a first box 1516 and a plateau is defined as being within a set of parameters/tolerances represented by a second box 1518. Similarly, in FIG. 15B, a first spike is defined as being within a set of parameters/tolerances represented by a first box 1520, a plateau is defined as being within a set of parameters/tolerances represented by a second box 1522, and a second spike is defined as being within a set of parameters/tolerances defined by a third box 1524.

In FIG. 15C, a first spike is defined as being within a set of parameters/tolerances represented by a first box 1526, a first plateau is defined as being within a set of parameters/tolerances represented by a second box 1528, a second plateau is defined as being within a set of parameters/tolerances represented by a third box 1530, a second spike is defined as being within a set of parameters/tolerances defined by a fourth box 1532, and a sloping plateau is defined as being within a set of parameters/tolerances defined by a fifth box (e.g., trapezoid) 1534. An artisan will understand from the disclosure herein that the pulses illustrated in FIGS. 15A, 15B and 15C are provided by way of example only and that methods described herein for characterizing pulses may be applied to pulses of any shape or having any number of spikes, plateaus and/or slopes.

Table 2 provides an example set of parameters that define a chair-shaped pulse according to one embodiment. An artisan will understand from the disclosure herein that the values listed in Table 2 for the various parameters are provided by way of example only, and not by limitation.

TABLE 2

| Parameter | Specified Value | Tolerance (+/−) | Units |
| --- | --- | --- | --- |
| Peak Time | 4 | 1 | nsec |
| Peak Width | 3.5 | 1 | nsec |
| Peak Height | 1 | 0.05 | normalized power |
| Plateau Start | 7 | — | nsec |
| Plateau Stop | W-1 | — | nsec |
| Plateau Height | 0.6 | 0.05 | normalized power |
| Rise Time | 2 | 1 | nsec |
| 10% Duration | W-2 | 2 | nsec |
| Peak Power | 1 | 0.05 | normalized power |

Figure 16A:
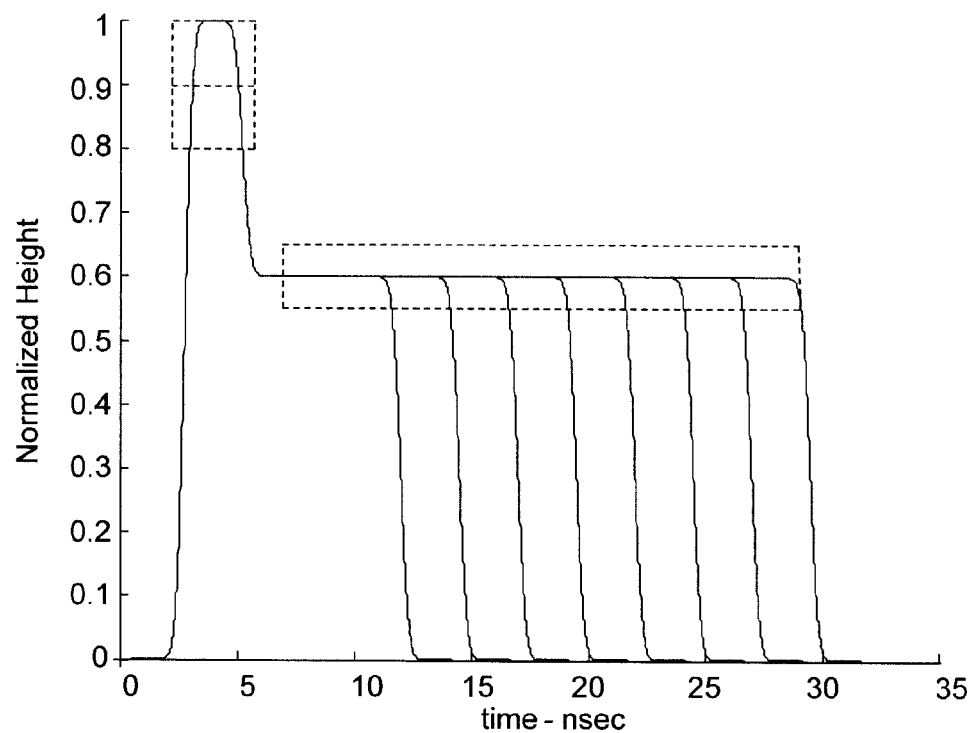
FIG. 16A graphically illustrates a plurality of tailored laser pulses as specified according to Table 2 according to one embodiment.
Figure 16B:
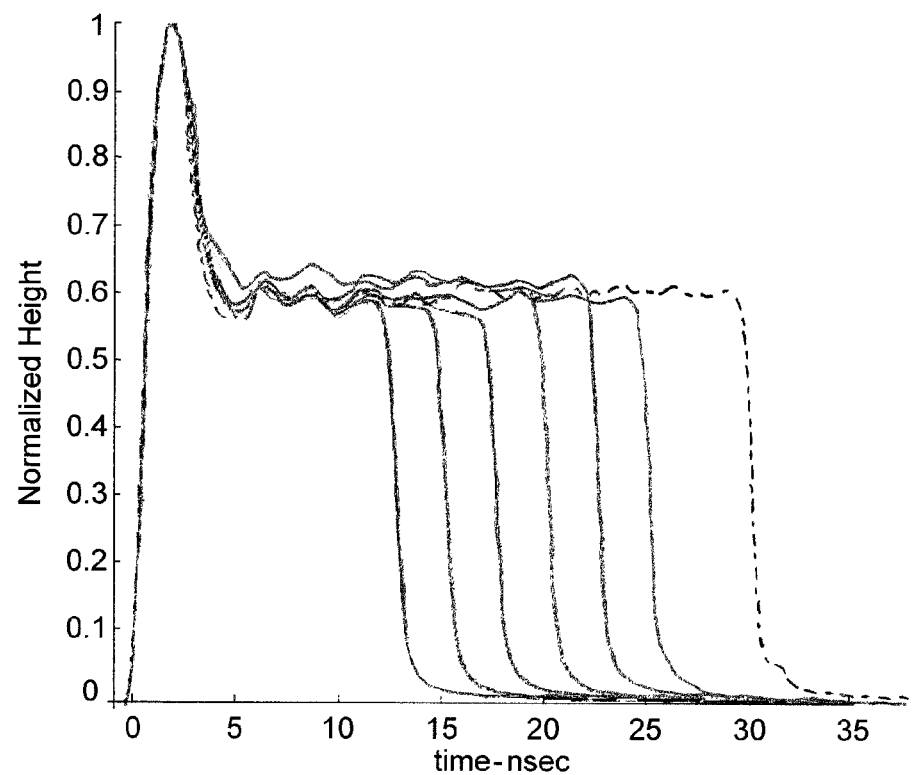
FIGS. 16B and 16C illustrate additional examples of tailored laser pulses according to certain embodiments.
Figure 16C:
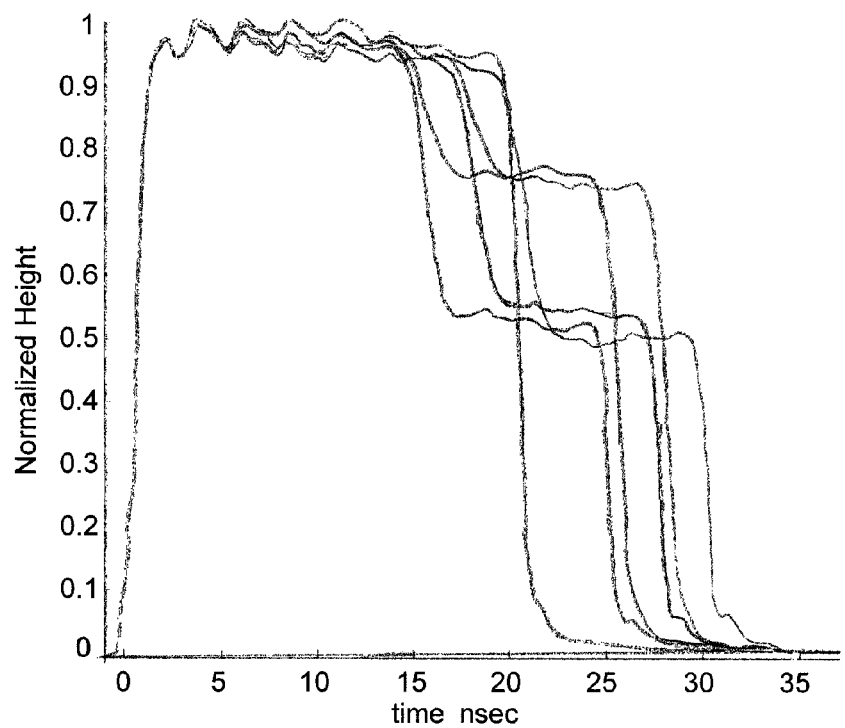

In Table 2, W is the chair width and may be varied to define a set of pulse shapes with different chair widths. For example, FIG. 16A graphically illustrates a plurality of tailored pulses (eight shown) as specified according to Table 2 with respective widths W=12.5, 15, 17.5, 20, 22.5, 25, 27.5, and 30. The values and tolerances shown in Table 2 define the characteristics of a spike within a first box 1610 and a plateau (with respective lengths W) within a second box 1612. FIGS. 16B and 16C illustrate additional examples of tailored laser pulses generated by a laser system according to certain embodiments.

4. Example Pulse Profiler

Figure 17:
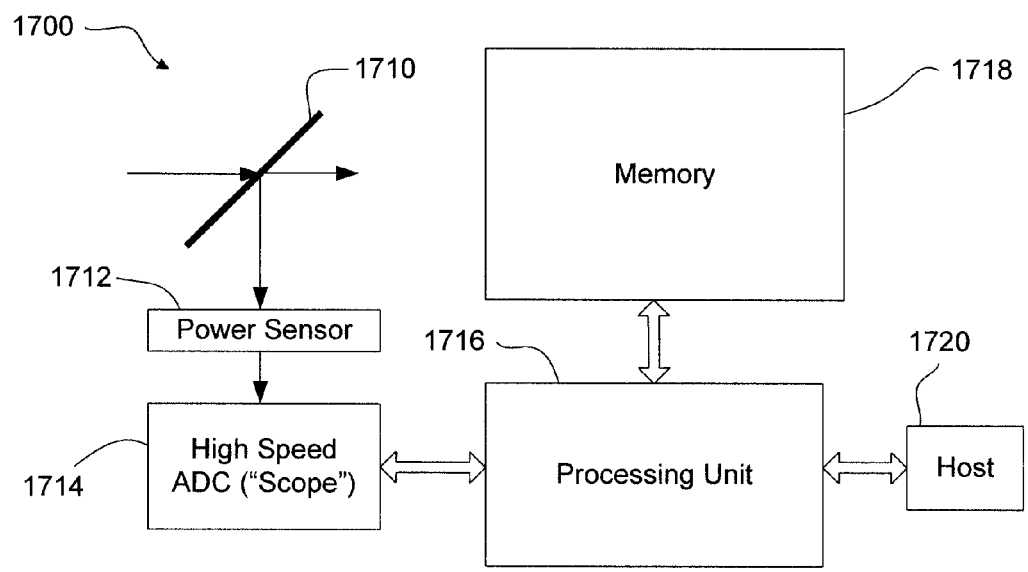
FIG. 17 is a block diagram of an example pulse profiler configured to provide feedback metrics of pulse shapes according to one embodiment.

FIG. 17 is a block diagram of an example pulse profiler 1700 configured to provide feedback metrics of pulse shapes according to one embodiment. The example pulse profiler 1700 includes an optical splitter 1710, a power sensor 1712, a high speed analog-to-digital converter (ADC) 1714 or "scope," a processing unit 1716, and a memory device 1718. In one embodiment, the processing unit 1716 is in communication with a host device 1720.

The optical splitter 1710 is configured to receive a laser pulse before it is delivered to a work surface, and to direct a portion of the laser pulse to the power sensor 1712. The analog output of the power sensor 1712 is provided to the high speed ADC 1714 to be properly conditioned and digitized. The power sensor 1712 and/or the high speed ADC 1714 may include appropriate logic to handle triggering on the relatively fast pulse shape (e.g., total temporal width of approximately 50 ns), which in some embodiments is received at a pulse repetition rate of approximately 100 kHz.

The high speed ADC 1714 provides data to the processing unit 1716 corresponding to the individual pulses. The processing unit 1716 filters the data and uses the filtered data to compute one or more of the metrics described above. The processing unit 1716 may send the computed metrics to the host 1720 for process monitoring and, in some embodiments, process control. The memory device 1718 is configured to record the data corresponding to the temporal pulse shapes and/or the corresponding computed metrics. In one embodiment, the data corresponding to the temporal pulse shapes are loaded into a circular buffer (not shown) and retrieved offline for study of the actual pulse shapes as opposed to runtime monitoring of the pulse shape metrics.

The pulse profiler 1700 may periodically or continuously compute the feedback metrics through either an automatic procedure or in response to a user command. The pulse profiler 1700 may compute the feedback metrics on every generated laser pulse, a large fraction of the generated laser pulses, or a small fraction of the generated laser pulses. The pulse profiler 1700 may also compute the feedback metrics when an external metric, such as a fixed-to-attempted ratio deviates from a normal or expected value.

When analysis of pulse shape data using the feedback metrics described above indicates that a pulse shape is non-optimal or is not within specified tolerances, the system may perform one or more corrective actions. For example, the system may display a warning to indicate that a pulse shape calibration is desired. In addition, or in another embodiment, the system may interrupt processing, prompt a user (e.g., a service engineer) to adjust the pulse shape, and restart processing.

In another embodiment, as discussed below, the system may automatically calculate one or more laser system input parameters to produce an improved pulse shape. The system may automatically implement these reconfigured parameters. In addition, or in another embodiment, the system may prompt a user (e.g., an operator or service engineer) to implement the automatically calculated system input parameters.

B. Pulse Shape Control

As discussed above, the information provided from pulse shape feedback may be used in many different ways with respect to pulse shape control. When providing multiple laser processing systems to a particular user, the process developed on one system may be reproduced on the other systems. Thus, according to one embodiment, each system is configured to reproduce the same nominal pulse shapes. The feedback provided by the various systems may be used to adjust the respective lasers as required during laser processing of a material or during a pulse shape setup procedure configured to provide this reproduction.

The information may also be used to provide pulse shape stability over time. For fiber laser or MOFPA based tailored pulse systems, for example, the pulse shape may distort as a function of the laser power available from the laser head. Or, the distortion may be due to degradation of laser system components, such as pump diodes or gain modules. Thus, runtime feedback is used in certain embodiments to adjust the pulse shapes periodically to maintain stability over time.

In one embodiment, an iterative learning method is used for pulse shape control. In the iterative learning algorithm, a waveform that is expected to repeat is compared to a nominal waveform and small adjustments are made to the appropriate control parameters until the measured shape converges to the nominal shape. The iterative learning algorithm is very effective at reproducing waveforms in non-linear environments and is particularly well suited to adjusting control parameters of tailored pulse shapes.

In certain embodiments, repetitive control techniques may be used to generate laser pulses with desired pulse shapes. Repetitive control/repetitive feed forward (FF) control uses an adaptive, evolving, or learning element to produce a desired outcome (e.g., pulse shape) from an input signal (e.g., a voltage applied to an acousto-optic deflector, an acousto-optic modulator, an electro-optic defector, or an electro-optic modulator) that can be changed to provided different pulse temporal profiles. Input parameters may also be controlled to program a laser power supply that is configured to receive amplitude commands in different bin command signals. Repetitive control may achieve a desired outcome even if the relationship between input and output is nonlinear.

In certain embodiment, a user is allowed to input a desired pulse shape, repetitive control techniques converge on the proper input signals to achieve this pulse shape, and a laser is appropriately configured. In addition, or in other embodiments, through application of repetitive control, system-to-system and laser-to-laser variability may be reduced or eliminated. Further, long-term/mid-term transient effects such as thermal shifts or degradation effects may be tuned out through application of repetitive control techniques. This type of tuning technique may be applied to any laser in which the output is shaped in terms of amplitude and/or time. The tuning technique may also be applied to fiber lasers, MOFPAs, or other types of lasers. The tuning technique may be applied in an occasional calibration step or continuously during system operation.

IV. Example "Sliced" Pulse Laser

Figure 18:
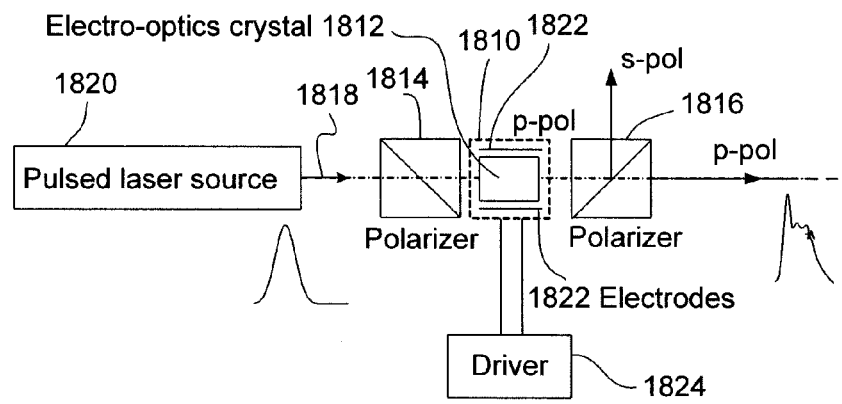
FIG. 18 is a simplified block diagram of an electro-optical modulator operating as a laser pulse slicing device in the production of tailored laser pulse output according to one embodiment.

FIG. 18 shows an electro-optical modulator 1810 that may be implemented in laser pulse "slicing" systems according to certain embodiments to produce tailored laser pulse output. The electro-optical modulator 1810 includes an electro-optical crystal 1812 cell that is positioned between light polarizing devices (polarizers) 1814 and 1816 and receives a beam of laser pulses 1818 emitted by a pulsed laser source 1820. The electro-optical crystal cell 1812 has electrodes 1822 to which drive output signals of driver circuitry 1824 are applied to contribute to shaping of incident laser pulses 1818. The laser source 1820 can be any pulsed laser emitting a laser pulse of a pulse width within a range of a few nanoseconds to 100 ns. The electro-optical crystal cell 1812 can be made of KDP, KD*P, ADP, AD*P, RTP, RTA, BBO, $LiNbO_3$, or other electro-optical materials. One example of a suitable electro-optical crystal cell 1812 is a LightGate 4 BBO Pockels cell manufactured by Cleveland Crystals, Inc., of Highland Heights, Ohio. The LightGate 4 cell can operate at 100 KHz, and its geometry minimizes the drive voltage to about 1.3 KV quarter-wave retardation at 355 nm. The LightGate 4 cell has only 4 pf capacitance, which provides a possibility of less than 2 ns rise and fall optical response times. One example of suitable driver circuitry 1824 is a high-voltage, fast switching time Pockels cell driver that is available from Bergmann Messegeraete Entwicklung, KG, Murnau, Germany.

A BBO based electro-optical modulator 1810 operates as a quarter-wave rotator in response to a quarter-wave drive voltage applied to electrodes 1822 of RTP cell 1812. The pulsed laser beam 1818 passes through the polarizer 1814 to become p-polarized (p-pol) as shown. The laser beam 1818 travels once through the BBO crystal cell 1812. When no drive voltage is applied to the electrodes 1822 of the BBO crystal cell 1812, the laser pulses remain in the p-pol state and pass through the polarizer 1816. When a quarter-wave drive voltage at the laser wavelength is applied to electrodes 1822 of the BBO crystal cell 1812, the polarization direction of the beam rotates 90 degrees and become s-polarized (s-pol). When a drive voltage applied to electrodes 1822 of BBO crystal cell 1812 is between 0 and the quarter-wave voltage, the portion of polarized laser beam 1818 transmitted from polarizer 1816 is approximately expressed as $$T=\sin^2[(\pi/2)(V/V_{1/2})],$$

where T is the transmission of the laser beam from the polarizer 1816, V is the voltage applied to the electrodes 1822 of the electro-optical crystal cell 1812, and $V_{1/2}$ is the half-wave voltage.

Figure 19:
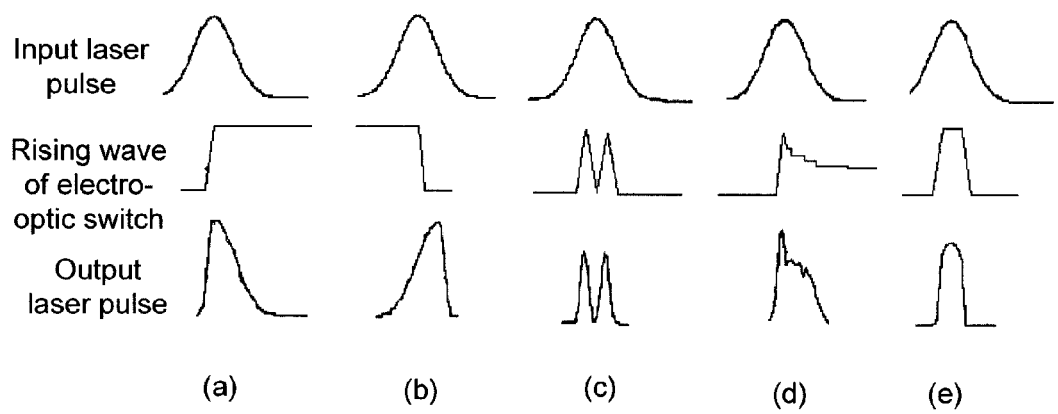
FIG. 19 shows in columns (a), (b), (c), (d), and (e) examples of five possible laser pulse shape formations produced by the laser pulse slicing device of FIG. 18.

Based on the above expression, the controllable transmission, T, of the electro-optical modulator 1810 provides a laser pulse shaping function. Theoretically, the transmission of the electro-optical crystal cell 1812 and the polarizers 1814, 1816 can be about 0%-100%. FIG. 19 shows five examples of possible laser pulse shapes. FIG. 19 shows as column (a) one example of pulse shaping, in which the transmission changes from 0% to 100% with less than a 2 ns rise time for the laser pulse to reach its peak and thereby provide a fast rising leading edge of the laser pulse. Skilled persons will recognize that in an alternative arrangement, known to the art as a double-pass configuration, a quarter-wave voltage may be employed to achieve a desired level of polarization rotation but that this improved efficiency is scheduled gained at the expense of greater optical alignment complexity.

Rise and fall times are related to the voltage and capacitance of the electro-optical cell, the switching time of drive circuit transistors, the repetition rates, and overall electrical power consumption. Lower voltage and capacitance of the electro-optical cell contribute to its fast response time; therefore, selection of a proper material for the electro-optical cell is important. Skilled persons will recognize that BBO and RTP exhibit useful material characteristics for implementation in electro-optical modulators. Koechner, *Solid-State Laser Engineering*, Springer-Verlag, states, for a longitudinal electro-optical cell in which the electric field is applied parallel to the crystal optic axis and in the same direction as the incident light, that phase difference, $\delta$, is related to the applied voltage in a crystal of length, l, by $$\delta=(2\pi/\lambda)n_0^3 r_{63} V_z,$$

where $V_z=E_z l$.

To obtain half-wave retardation, a Pockels cell produces a phase difference $\delta=\pi$. In this case, for linearly polarized light incident on the Pockels cell, the output beam is also linearly polarized but with a plane of polarization rotated by 90 degrees. By incorporation of polarizing optics well known in the art, the Pockels cell can function as a voltage-controlled optical modulator. Koechner expresses the transmission, T, dependence of such a device as:

$$T=\sin^2[(\pi/2)(V/V_{1/2})],$$

where the half-wave voltage is given by $V_{1/2}=\lambda/2n_0^3 r_{63}$.

For a transverse electro-optical crystal cell, in which the electric field is applied perpendicularly to the direction of the beam, the half-wave voltage is given by $$V_{1/2}=\lambda d/2n_0^3 r_{63} l.$$

This type of electro-optical crystal cell has the useful attribute that the half-wave voltage depends on the ratio of crystal thickness to length and, by proper selection of these parameters, electro-optical crystal cells may be designed that operate at lower applied voltages than those applied to longitudinal electro-optical crystal cells to achieve a given phase difference.

Skilled persons will recognize that the term $r_{63}$ in the above equations represents the electro-optic coefficient for phosphates of the KDP family. RTP crystal is an important member of this family and is a preferred electro-optical crystal material for the preferred embodiments described for use with 1064 nm laser input. BBO crystal is preferably used with 355 nm laser input.

RTP crystal has a low voltage requirement (about 1.6 KV for $\pi$ or half-wave retardation and a 3.5 mm aperture) for 1064 nm laser input and can operate to a 10 MHz repetition rate. RTP crystal cannot perform well when the average power is generally more than 10 W or is not suitable for UV applications because of transparency restrictions. For these latter applications as noted above, BBO is preferred. In practice, it is difficult to drive BBO at 100 KHz for 1064 nm laser because of the high voltage requirement (about 6 KV at half-wave retardation). Therefore, the RTP electro-optical crystal cell is the currently preferred choice for a 1064 nm laser, and the BBO electro-optical crystal cell is preferred for 355 nm laser (about 1.3 KV at half-wave retardation for a LightGate 4 BBO Pockels cell). Other electro-optical materials, such as KDP, RTA, and ADP, have main limitations on use at high repetition rates and pulse modulation because of piezo-electric (PE) resonances. Faster rise and fall times result in higher frequency components, so there is a greater chance that one of these frequency components will fall into the principal resonance frequencies. This is especially true of a fast rise time tailored pulse, which contains many frequency components that extend in frequency well above the fundamental repetition rate.

To generate tailored pulse shapes, the embodiments are implemented with a "fast multi-state" (FMS) electro-optical modulator that is designed to avoid PE resonances. For 1064 nm laser output, this is accomplished by using an electro-optical cell made of RTP crystal material and short electrical pulses, which do not generate significant PE resonances. Pulse lengths on the order of nanoseconds result in relatively low PE resonances. For example, an RTP electro-optical crystal cell can reach a repetition rate of 10 MHz for 5% duty cycle pulses.

Another concern of obtaining fast rising and falling time is the design of the electro-optical modulator driver. There is no actual limitation of an electro-optical crystal cell preventing it from producing sub-nanosecond or picosecond switching times; therefore, a fast switching time depends mainly on the electrical driver. Skilled persons recognize that there are two principal types of electrical switchers: avalanche transistor and MOSFET. The transistors operate within a very limited voltage range to attain the fastest switching time. A stack of 7 to 10 transistors may be used to operate in the 1.6 KV range. Avalanche transistors can achieve a 2 ns switching time, but their repetition rates are limited to less than 10 KHz. For higher repetition rates, MOSFETs are currently preferred, because, generally, they have a 1 ns response time and maximum 1 KV operating voltage. A stack of at least 2 to 3 MOSFETs is used to operate in the 1.6 KV range.

The selection of MOSFETs and circuit design are, therefore, germane to accomplish FMS pulse modulation. In particular, the driver circuit power consumption is of concern because it is proportional to the square of the peak operating voltage. For example, a BBO electro-optical cell operating at about 6 KV requires approximately 1814 times as much power consumption as that of an RTP electro-optical cell operating at 1.6 KV to achieve a comparable phase shift at a given repetition rate. Skilled persons will recognize that lowering the operating voltage reduces the power consumption. It is possible to reduce the number of MOSFETs, which in turn provides better performance of FMS pulse modulation through judicious choice of the aperture size and resulting drive voltage. In one embodiment of a transverse electro-optical modulator, a reduction in the apertures of RTP and BBO electro-optical crystal cells to about 2 mm gives corresponding reductions in half-wave retardation voltages to about 800 V and 4 KV at 1064 nm, for RTP and BBO electro-optical crystal cells, respectively.

An FMS electro-optical modulator is capable of multiple programmable steps of modulation, in which each step has a rise time of less than about 4 ns and a fall time of less than about 4 ns, and more preferably, in which each step has a rise time of less than about 2 ns and a fall time of less than about 2 ns. An operational advantage of the disclosed embodiments is that they provide a tailored pulse shape that may be programmed to have more than one amplitude value. Another such operational advantage is the capability of providing programmable tailored pulse shapes with discrete amplitude and time duration components. Such capability is particularly useful in the production of tailored pulse output with a pulse shape of the type shown in FIG. 19(a). This pulse shape has, with respect to the first amplitude maximum, a total fall time that is substantially longer than the rise time to the first amplitude maximum.

Embodiments may be implemented with one or more electro-optical modulators receiving drive signals that selectively change the amount of incident pulsed laser emission to form a tailored pulse output. Triggering the drive signal from the pulsed laser emission suppresses jitter associated with other stages of the system and substantially removes jitter associated with pulsed laser emission build-up time. The tailored pulses can be power-scaled for harmonic generation to shorter wavelengths.

It will be understood by those having skill in the art that many changes may be made to the details of the above-described embodiments without departing from the underlying principles of the invention. The scope of the present invention should, therefore, be determined only by the following claims.

The invention claimed is:

1. A method for processing a workpiece with a laser, the method comprising:
    associating a plurality of temporal pulse profiles with respective target classes, each temporal pulse profile being tailored for a type of target in the corresponding target class, at least a first temporal pulse profile comprising a plurality of features within a single pulse that define a different shape than that of a second temporal pulse profile, and wherein the plurality of features are selected from a group comprising one or more peaks, one or more plateaus, and one or more slopes;
    selecting a first target on the workpiece to process, the selected first target corresponding to a first target class associated with the first temporal pulse profile, wherein a second target on the workpiece is associated with a second temporal pulse profile corresponding to a second target class;
    selecting, in response to the selection of the first target to process, the first temporal pulse profile for processing the first target;
    generating a laser pulse based on laser system input parameters configured to shape the laser pulse according to the selected first temporal pulse profile;
    detecting a temporal pulse profile of the generated laser pulse;
    comparing the detected temporal pulse profile of the generated laser pulse to the selected first temporal pulse profile, wherein the comparison determines whether each of the plurality of features are within a predetermined tolerance; and
    adjusting the laser system input parameters based on the comparison.

2. The method of claim 1, wherein a first portion of the first temporal pulse profile comprises a power spike during a first time duration and a second portion of the first temporal pulse profile comprises a power plateau during a second time duration, and wherein the first time duration is substantially shorter than the second time duration.

3. The method of claim 1, wherein comparing comprises measuring one or more characteristics of the detected laser pulse selected from the group comprising a peak pulse power, a pulse rise time, and a pulse duration.

4. The method of claim 3, wherein measuring the pulse duration comprises determining a time interval between a first time and a last time when the pulse power approximately equals a predetermined percentage of the peak pulse power.

5. The method of claim 3, wherein measuring the pulse duration comprises determining a time integral squared ($T_{IS}$) pulse duration defined by the equation:

$$T_{IS} = \frac{\left(\int I(t)dt\right)^2}{\int I^2(t)dt},$$

wherein l(t) is the pulse curve in power versus time.

6. The method of claim 1, further comprising determining a statistical metric of the detected laser pulse as compared to the first temporal pulse profile associated with the first target class.

7. The method of claim 6, wherein the statistical metric is selected from the group comprising a standard deviation, a standard deviation of a time derivative, a root-mean-square (RMS), and an integral of an absolute error.

8. The method of claim 1, wherein the first temporal pulse profile comprises a first portion corresponding to a first pulse feature in a first time duration and a second portion corresponding to a second pulse feature in a second time duration, and wherein comparing comprises characterizing a spike corresponding to the first portion of the first temporal pulse profile by measuring a peak height corresponding to a maximum power of the spike.

9. The method of claim 8, further comprising measuring a width corresponding to a time interval between a first time and a last time that a power level of the spike approximately equals a predetermined power level between the peak height of the spike and a maximum power level corresponding to the second portion of the first temporal pulse profile.

10. The method of claim 8, further comprising measuring a peak time corresponding to an average of a first time and a last time that the power level of the spike approximately equals a predetermined percentage of the peak height of the spike.

11. A laser processing system for processing a workpiece, the system comprising:
a memory device storing associations between a plurality of temporal pulse profiles with respective target classes, each temporal pulse profile being tailored for a type of target in the corresponding target class, at least a first temporal pulse profile comprising a plurality of features within a single pulse that define a different shape than that of a second temporal pulse profile, and wherein the plurality of features are selected from a group comprising one or more peaks, one or more plateaus, and one or more slopes;
a controller configured to select a first target on the workpiece to process, the selected first target corresponding to a first target class associated with the first temporal pulse profile, wherein a second target on the workpiece is associated with a second temporal pulse profile corresponding to a second target class, the controller further configured to select, in response to the selection of the first target to process, the first temporal pulse profile for processing the first target;
a laser source configured to generate a laser pulse based on laser system input parameters received from the controller, the laser system input parameters configured to shape the laser pulse according to the selected first temporal pulse profile; and
a pulse detection module configured to detect a temporal pulse profile of the generated laser pulse,
wherein the controller is configured to:
compare the detected temporal pulse profile of the generated laser pulse to the first temporal pulse profile, wherein the comparison determines whether each of the plurality of features are within a predetermined tolerance, and
adjust the laser system input parameters based on the comparison.

12. The system of claim 11, wherein the laser source is selected from the group comprising a fiber laser, a master oscillator fiber power amplifier (MOFPA), a tandem photonic amplifier, and a sliced pulse laser.

13. The system of claim 11, wherein the pulse detection module comprises:
a photodetector;
a high-speed analog-to-digital converter; and
a beam splitter configured to direct the laser pulse to both the photodetector and the selected target.

14. The system of claim 11, wherein comparing comprises determining a time interval between a first time and a last time when the pulse power approximately equals a predetermined percentage of a maximum pulse power.

15. The system of claim 11, wherein comparing comprises determining a time integral squared ($T_{IS}$) pulse duration defined by the equation:

$$T_{IS} = \frac{\left(\int I(t)dt\right)^2}{\int I^2(t)dt},$$

wherein l(t) is the pulse curve in power versus time.

16. The system of claim 11, wherein the controller is further configured to determine a statistical metric of the detected laser pulse as compared to the first temporal pulse profile associated with the target class.

17. The method of claim 16, wherein the statistical metric is selected from the group comprising a standard deviation, a standard deviation of a time derivative, a root-mean-square (RMS), and an integral of an absolute error.

18. The system of claim 11, wherein the first temporal pulse profile comprises a first portion corresponding to a first pulse feature in a first time duration and a second portion corresponding to a second pulse feature in a second time duration, and wherein the comparing comprises characterizing a spike corresponding to the first portion of the first temporal pulse profile by measuring a peak height corresponding to a maximum power of the spike.

19. The system of claim 18, wherein the controller is further configured to determine a width corresponding to a time interval between a first time and a last time that the spike's power approximately equals a predetermined power level between the peak height of the spike and a maximum power level corresponding to the second portion of the first temporal pulse profile.

20. The system of claim 18, wherein the controller is further configured to determine a peak time corresponding to an average of a first time and a last time that the spike's power approximately equals a predetermined percentage of the peak height of the spike.

* * * * *